US007985778B2

(12) United States Patent
Nakamura

(10) Patent No.: US 7,985,778 B2
(45) Date of Patent: Jul. 26, 2011

(54) METHOD FOR DECOMPOSING AND RECLAIMING SYNTHETIC RESIN HAVING ESTER BOND IN THE COMPOSITION STRUCTURE

(76) Inventor: Koichi Nakamura, Hachioji (JP)

( * ) Notice: Subject to any disclaimer, the term of this patent is extended or adjusted under 35 U.S.C. 154(b) by 288 days.

(21) Appl. No.: 12/224,718

(22) PCT Filed: Mar. 6, 2007

(86) PCT No.: PCT/JP2007/054291
§ 371 (c)(1),
(2), (4) Date: Sep. 4, 2008

(87) PCT Pub. No.: WO2007/102488
PCT Pub. Date: Sep. 13, 2007

(65) Prior Publication Data
US 2009/0099270 A1    Apr. 16, 2009

(30) Foreign Application Priority Data

Mar. 7, 2006    (JP) .................................. 2006-060529
Jan. 25, 2007   (JP) .................................. 2007-014951

(51) Int. Cl.
*C08J 11/04*    (2006.01)
(52) U.S. Cl. ............. 521/45; 521/40; 521/40.5; 521/41; 528/480; 528/499; 528/500; 528/501; 528/503; 562/580; 562/589
(58) Field of Classification Search .................. 521/40, 521/40.5, 41, 45, 45.5, 46, 47, 48; 562/580, 562/589; 549/273; 209/3, 11; 528/480, 528/481, 499, 500, 501, 502 R, 502 A, 502 C, 528/503
See application file for complete search history.

(56) References Cited

U.S. PATENT DOCUMENTS 5,326,791 A * 7/1994 Saleh et al. ..................... 521/45
6,905,600 B2 * 6/2005 Lee, Jr. .......................... 210/603

FOREIGN PATENT DOCUMENTS

| JP | 11-292777 A | 10/1999 |
| JP | 2002-363336 A | 12/2002 |
| JP | 2003-183507 A | 7/2003 |
| JP | 2003-313283 A | 11/2003 |
| JP | 2005-95729 A | 4/2005 |
| JP | 2005-330211 A | 12/2005 |

OTHER PUBLICATIONS

Office translation of MIURA et al, JP 2005/095729.*

* cited by examiner

*Primary Examiner* — James Seidleck
*Assistant Examiner* — Frances Tischler
(74) *Attorney, Agent, or Firm* — Birch, Stewart, Kolasch & Birch, LLP

(57) ABSTRACT

Synthetic resin containing ester bond is subjected to hydrolysis treatment to reclaim raw material component before polymerization. Method for decomposing and reclaiming synthetic resin having ester bond in composition structure thereof, by conducting hydrolysis treatment and then separation collection treatment. In the hydrolysis treatment, article containing synthetic resin to be decomposed and reclaimed is exposed to water vapor atmosphere filled under saturation water vapor pressure at treatment temperature at or below melting point of the synthetic resin. The synthetic resin in article to be treated is hydrolyzed by water vapor generated at the treatment temperature, to generate decomposition product before polymerizing to the synthetic resin containing an ester bond. The separation collection treatment is treatment in which the decomposition product generated by the hydrolysis treatment is separated into liquid component and solid component to be collected individually.

13 Claims, 19 Drawing Sheets

METHOD FOR DECOMPOSING AND RECLAIMING SYNTHETIC RESIN HAVING ESTER BOND IN THE COMPOSITION STRUCTURE

TECHNICAL FIELD

The present invention relates to a method for applying hydrolysis treatment to a synthetic resin having ester bond in the composition structure thereof, thus reclaiming raw material components before polymerization.

BACKGROUND ART

The hydrolysis capability of polymer organic compounds is one of astonishing performances given to microorganisms in the nature. Microorganisms readily perform the reaction in a quite natural environment of normal temperature and pressure, thus breaking the organic molecular chain to decrease the molecular weight of the organic compound. The method is the one acquired and improved by microorganisms during a long period of several hundreds of millions of years, and is normally called the "method of hydrolysis by enzymes".

The method of hydrolysis by enzymes is difficult for human to follow, at least at present, even with the total human intellectual power. The decomposition products of the "method of hydrolysis by enzymes", or the resulting substances of decomposition given by microorganisms, become useful components for all the other living things, and they are the basic elements which can be absorbed by the living things to become tissue thereof.

Although the method of hydrolysis by enzymes is difficult for human to follow, at present, there is one method to obtain the same result thereto using a method other than the method of hydrolysis by enzymes. The method is the "method of hydrolysis using physical energy". The method inherently resembles the phenomenon of decomposition by geothermal water erupted from earth interior at the bottom of deep sea, or at several thousands of meters below the sea level. According to the method, the reaction proceeds in a state far beyond the water critical condition of both temperature and pressure, (375° C. and 220 atm). As the result of the reaction, organic compounds can be hydrolyzed, many kinds of substances (compounds) including metals can be decomposed, and the structural components of substances can be eluted.

The hydrolysis can be applied also when that high pressure and high temperature condition is brought into a more practical state (to a state more close to normal temperature). In particular, when organic matter is placed at a state exceeding 100° C. and 1 atom, the organic matter is gradually hydrolyzed with time. Consequently, the result of the "method of hydrolysis using physical energy" becomes equivalent to the result of the "method of hydrolysis by enzymes" executed by microorganisms. There are introduced methods for decomposing biodegradable plastics and the like utilizing the principle: for example, Patent Document 1 discloses the method of utilizing supercritical hot-water treatment, and Patent Document 2 discloses the method of utilizing hot water in subcritical state.

Not limiting to the reaction examples in supercritical state and subcritical state, generally there occurs phase transition of substances under high pressures even at relatively low temperatures owing to the influence of partial pressure ratio. For the case of organic matter, however, there is a risk of carbonization if the pressure is higher than the saturation water vapor pressure even at a relatively low temperature, and of liquefaction and inclusion of solvent and the like if the temperature is lower than that of saturation water vapor pressure. Therefore, actual and effective utilization of the "method of hydrolysis using physical energy" is difficult to establish the treatment conditions including temperature and pressure.

That is, for utilizing the supercritical fluid and the subcritical fluid in the treatment, there is required a treatment apparatus that generates an extremely high temperature and pressure condition, and that maintains the generated temperature and pressure condition. Generally the apparatus to maintain high temperature and high pressure state becomes difficult in fabrication with increase in the capacity thereof, and the fabrication cost remarkably increases with increase in the capacity thereof, thus the application to large scale industrial facilities is difficult. Furthermore, the extremely high decomposition capability of supercritical hot water and subcritical hot water affects not only the target organic matter for treatment but also the treatment vessel, which requires to use expensive materials to the apparatus to prevent decomposition of the treatment vessel.

Among the synthetic resins having ester bond in the composition structure thereof, polylactic acid products receive specifically high social expectation, thus they have begun to be used in many fields in recent years. They have, however, basic problems of long molding cycle, of inferiority in the characteristic of thermal resistance of the produced molded articles, and further in the mechanical characteristics (toughness, impact resistance, and the like) compared with those of existing synthetic resin molded articles.

To solve the problems, there were generally given many countermeasures, including mixing the polylactic acid with other existing synthetic resins, and mixing various kinds of substances as filler, thus the polylactic acid products have been entering practical applications. On actual use of the polylactic acid as the material of the products, solvent, coloring pigment, and the like are blended therein, thus normally the products contain many kinds of coexisting substances.

The most efficient and desired reclaim to reuse of the polylactic acid products after use is to recycle thereof by recovering the used polylactic acid products to the raw material of the polylactic acid products. In view of utilization as the raw material of the polylactic acid products, it is natural to desire to bring back to high purity lactic acid raw material. However, reuse of the polylactic acid products is difficult.

Patent Document 1: Japanese Patent Laid-Open No. 11-292777

Patent Document 2: Japanese Patent Laid-Open No. 2003-313283

DISCLOSURE OF THE INVENTION

Problems to be Solved by the Invention

As a method to solve the problems, the inventor of the present invention once proposed a method for reclaiming lactic acid from polylactic acid products by controlling temperature and pressure of the hydrolysis treatment environment under saturation water vapor pressure. The method hydrolyzes a polylactic acid product under the saturation water vapor pressure to collect a large quantity of lactic acid in solution state.

In actual recycling of polylactic acid products, however, there is a need of treatment of substances mixed in the products, and there are many kinds of mixing substances such as ink and paint attached to the products, and filler. Therefore, practical application of the technology has the problem of separation of them and of how to extract sole lactic acid.

Considering the above situations, utilization as the raw material of polylactic acid products needs to establish a method for separating the decomposition products and further to establish a method for securing purity and concentration of the raw material.

The above situations are not limited to the biodegradable plastics such as polylactic acid, and are applied also to synthetic resins having ester bond in the composition structure thereof, which synthetic resins can be treated by decomposition to the raw material components before polymerization, through the hydrolysis treatment, even if the synthetic resins are non-biodegradable plastics.

Means to Solve the Problems

The present invention is not necessarily limited to polylactic acid, and has actualized a recycle system to reclaim the raw material resin before polymerization thereof, through the hydrolysis treatment of general synthetic resins having ester bond in the composition structure thereof and through the separation and collection of the respective decomposition products.

Effect of the Invention

According to the present invention, the waste of synthetic resin products having ester bond in the composition structure thereof can be hydrolyzed without establishing the supercritical state or the subcritical state, and the reaction products can be separated into gas or liquid component and solid component, thus can be collected the respective components. As a result, there are obtained the decomposition products before polymerizing to the synthetic resin having ester bond in the composition structure thereof, and the components of decomposition products can be used as the raw materials to regenerate the resin products with quality equal to or higher than that of the original resin products. The repeated application of the cycle does not induce deterioration of the reclaimed raw materials as the raw materials. Consequently, according to the present invention, the problem of waste treatment and the problem of effective utilization of resources are solved, and a favorable resource closed cycle system can be established.

DESCRIPTION OF THE REFERENCE SYMBOLS

Figure 1:
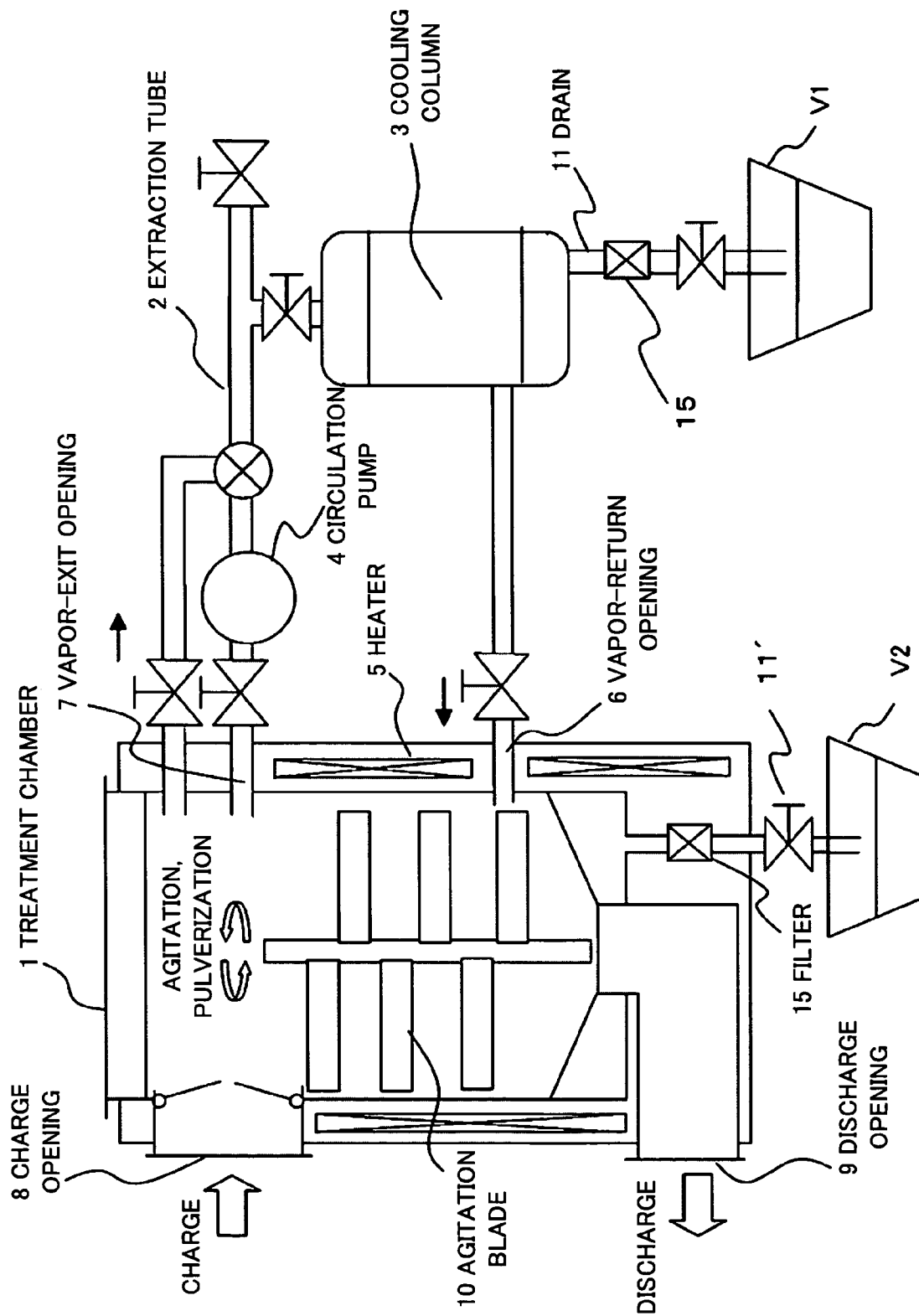
FIG. 1 shows a scheme of the hydrolysis apparatus.

| | |
|---|---|
| 1 | treatment chamber |
| 2 | extraction tube |
| 3 | cooling column |
| 4 | circulation pump |
| 5 | heater |
| 6 | vapor-return opening |
| 7 | vapor-exit opening |
| 8 | charge opening |
| 9 | discharge opening |
| 10 | agitation blade |
| 11,11' | drain |
| 12 | central monitoring room |
| 13 | hydrolysis control unit |
| 14 | monitor |
| 15 | filter |
| 16 | treatment chamber for the pretreatment |
| V1,V2 | vessel |

BEST MODES FOR CARRYING OUT THE INVENTION

Embodiment 1

The following is an embodiment of the present invention. The present invention is an invention of a method for reclaiming raw material components, before polymerization, from a synthetic resin having ester bond in the composition structure thereof by the sequence of hydrolysis treatment and separation collection treatment. In the hydrolysis treatment, an article to be treated containing a synthetic resin having ester bond in the composition structure thereof is exposed to a water vapor atmosphere filled under the saturation water vapor pressure at a treatment temperature under the condition of treatment temperature at or below the melting point of the synthetic resin. The synthetic resin in the article to be treated is hydrolyzed by the water vapor generated at the treatment temperature. As a result, the raw material components before polymerizing to the synthetic resin having ester bond in the composition structure thereof are reproduced. In the separation collection treatment, the decomposition products generated by the hydrolysis treatment are separated into gas or liquid component and solid component. The gas or liquid component is the raw material component before polymerizing to the synthetic resin having ester bond in the composition structure thereof. By further removing the solid component in the liquid component with a filter, the purity of the liquid component can be increased. Furthermore, control of descending temperature can remove the deposited crystalline component from other water-soluble components (such as pigment) so that the selected specific component can be obtained as a high purity simple substance.

The article to be treated for the hydrolysis treatment prefers lactic acid-based biodegradable plastics. For the treatment of that case, water is added to the article to be treated in a sufficient quantity to obtain the saturation water vapor pressure, thus conducting reaction between the article to be treated containing biodegradable plastics prepared from lactic acid as the raw material and water (vapor) under a high temperature and high pressure condition. As a result, the reaction hydrolyzes the biodegradable plastics to yield an aqueous solution of lactic acid. For example, when the article to be treated is made of polylactic acid, it is suitable to bring the article to be treated and water react each other while adding water in a quantity of about 20% of the amount of article to be treated under a condition of high temperature and high pressure. For the case of above hydrolysis treatment, it is preferable that the hydrolysis reaction of the lactic acid-based biodegradable plastics proceeds under a condition of saturation water vapor pressure at 140° C. Then, the polylactic acid is decomposed into crude lactic acid, and the crude lactic acid is dissolved in aqueous solution. The following is the description of examples of the method according to the present invention applied to reclaim the polylactic acid products.

FIG. 1 shows an embodiment of apparatus used for the hydrolysis treatment of the present invention. In FIG. 1, the apparatus conducting the hydrolysis treatment is structured by a combination of a treatment chamber 1, an extraction tube 2, a cooling column 3, and a circulation pump 4. The treatment chamber 1 is a kettle which conducts hydrolysis treatment by heating the article to be treated charged into the chamber, and has a jacket heater 5 (electric heater in this example) on outer wall thereof. The treatment chamber 1 and the cooling column 3 are connected each other by the extraction tube 2.

The extraction tube 2 is a circulation pipeline connecting a vapor-return opening 6 located at lower part of the treatment chamber 1 with a vapor-exit opening 7 located at upper part of the treatment chamber 1. The cooling column 3 is connected to the pipeline. The circulation pump 4 is connected to the pipeline at upstream side of the cooling column 3. The treatment chamber 1 has a charge opening 8 and a discharge opening 9 for the article to be treated. The treatment chamber 1 is equipped with agitation blades 10 therein, which agitation blades 10 rotate around the central vertical shaft to agitate the article to be treated charged into the treatment chamber 1.

The cooling column 3 is a heat exchanger to cool the gas (vapor) in the extraction tube 2. After finishing the hydrolysis treatment of the article to be treated, the circulation pump 4 forcibly blows water vapor in the treatment chamber 1 into the cooling column 3. The cooling column 3 has a drain 11 to hold the aqueous solution of extracted crude lactic acid which is a hydrolyzed component in the vapor in the cooling column 3. The aqueous solution of crude lactic acid once held in the cooling column 3 is collected in a vessel V1 as the extract. The aqueous solution of crude lactic acid which is once gasified after the hydrolysis and is dissolved in water in the chamber 1 is collected into a vessel V2 by opening a drain 11'. Each of the vessels V1 and V2 or each of the drains 11 and 11' has a filter 15.

Figure 2:
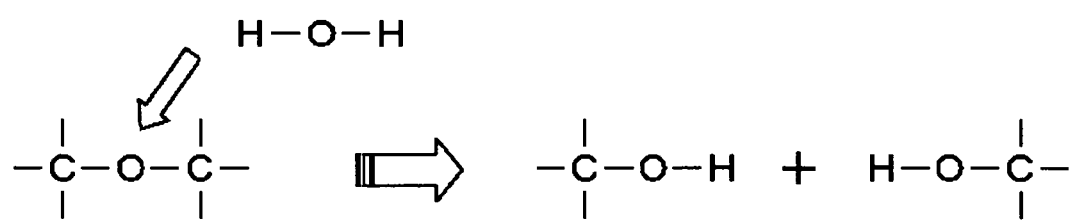
FIG. 2 illustrates the mechanism of hydrolysis of organic matter.

With the above apparatus, the hydrolysis treatment is applied to the waste containing polylactic acid resin products as the article to be treated. FIG. 2 shows the mechanism of decomposition of organic matter by hydrolysis. As illustrated in FIG. 2, hydrolysis is a reaction in which hydrogen ion and hydroxide ion ($H^+$ and $OH^-$) are brought to react between the oxygen and other atom (for example, carbon C) of bonding organic matter, thus breaking the bond.

That is, hydrolysis is a phenomenon in which electrons migrate and segregate between [C] and [O] to induce polarization, and hydrogen ion and hydroxide ion, [$H^+$] and [$OH^-$], are attracted to the polarized position to electrically bond thereto. The energy of each of electron and atom is deeply related to the hydrolysis, thus the setting of temperature and pressure directly affects the excitation energy of the electron and the atom. Consequently, the reaction rate of hydrolysis varies with the temperature and pressure during the reaction.

For example, lactic acid as the raw material of polylactic acid sublimates to become gas, melts to become liquid, or evaporates to become gas depending on the temperature ranges. The melting itself, however, is a reaction accompanied with decomposition. When lactic acid is decomposed, it is no more the pure lactic acid, and it is difficult to be used as the raw material of polylactic acid. To this point, the delicate reaction zone can be passed through by controlling the temperature and pressure of the environment.

Figure 3:
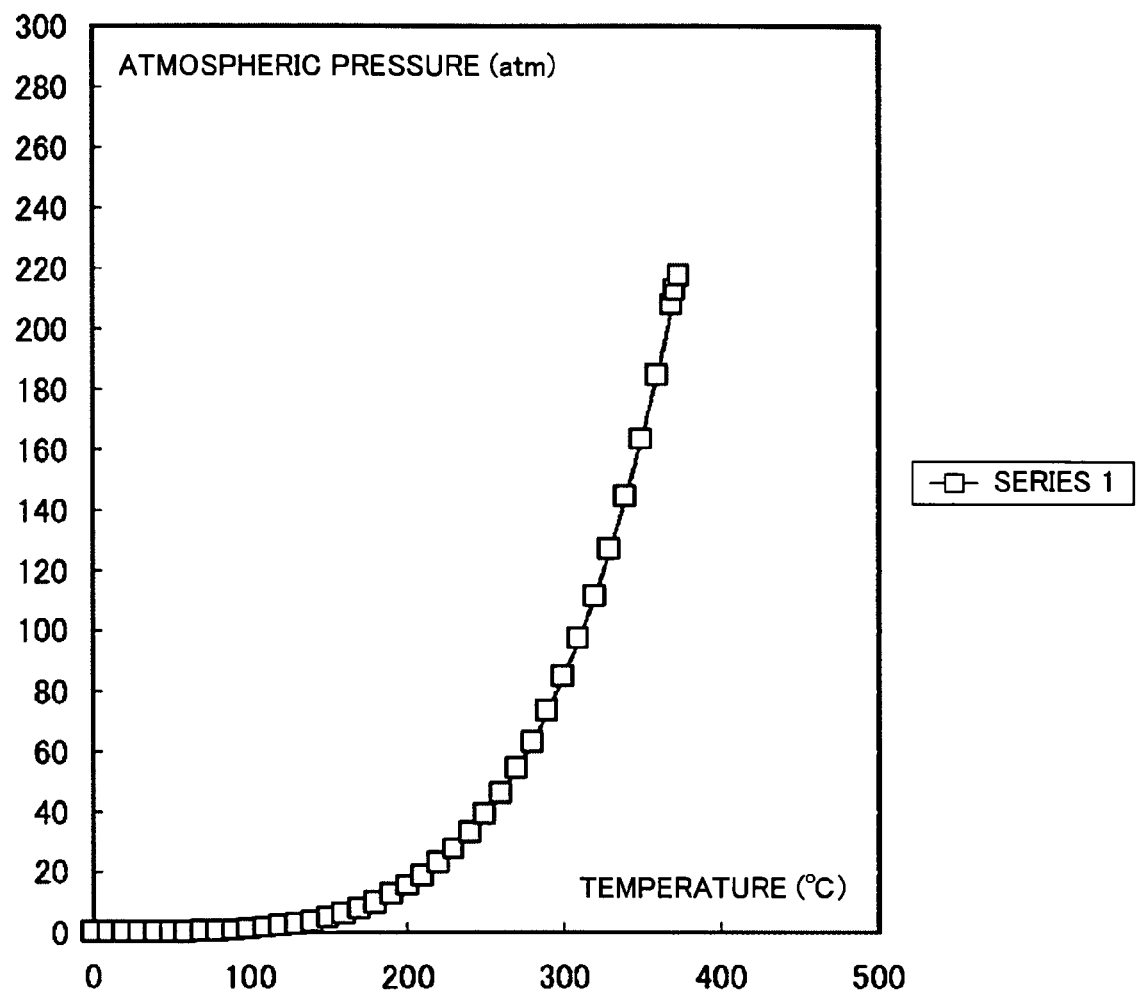
FIG. 3 is a graph showing a saturation water vapor pressure curve.

By controlling the temperature and pressure in that state, the polylactic acid resin is hydrolyzed to obtain lactic acid monomer. The lactic acid monomer sublimates to once become gas even at a relatively low temperature if only the pressure is high. Since the gas is water-soluble, it instantaneously dissolves in hot water in a large quantity under high pressure. Consequently, the large quantity of lactic acid can be collected as solution. According to the present invention, the hydrolysis treatment controls the temperature and pressure in the treatment chamber 1. In that control, as illustrated in FIG. 3, the water vapor pressure is increased along the saturation water vapor pressure curve, and, on completing the reaction, the temperature is lowered.

For the case that gas and liquid phases of a single component system coexist under a certain temperature and pressure condition, for example, if the vapor forming the gas phase reaches the saturation state, the vapor is called the "saturated vapor". The pressure at that point is the saturated vapor pressure. Surrounding a liquid of a certain substance, when the partial pressure of the substance is equal to the vapor pressure of the liquid, the liquid and the gas are in a gas-liquid equilibrium state. When the temperature is lowered, the vapor condensates to become liquid. Inversely, when the temperature is increased, the liquid gasifies (becomes vapor). Similar equilibrium state is maintained between solid phase and gas phase, which phase transition is called the "sublimation".

In the hydrolysis treatment, the water vapor pressure as the partial pressure in the treatment chamber 1 is controlled along the saturation water vapor pressure curve. In this state, since the partial pressure ratio of the lactic acid is very low, the water vapor pressure is predominant. In a zone of temperature and pressure of vapor containing lactic acid-based biodegradable plastics, there are risks of carbonization of the lactic acid-based biodegradable plastics if the temperature is higher (even at a slight degree) than that of the saturation water vapor pressure, and of liquefaction and inclusion of solvent if the temperature is lower than that of saturation water vapor pressure. Therefore, the delicate reaction zone is passed through by the computer-control of the temperature and pressure of the environment in the treatment chamber.

Figure 4:
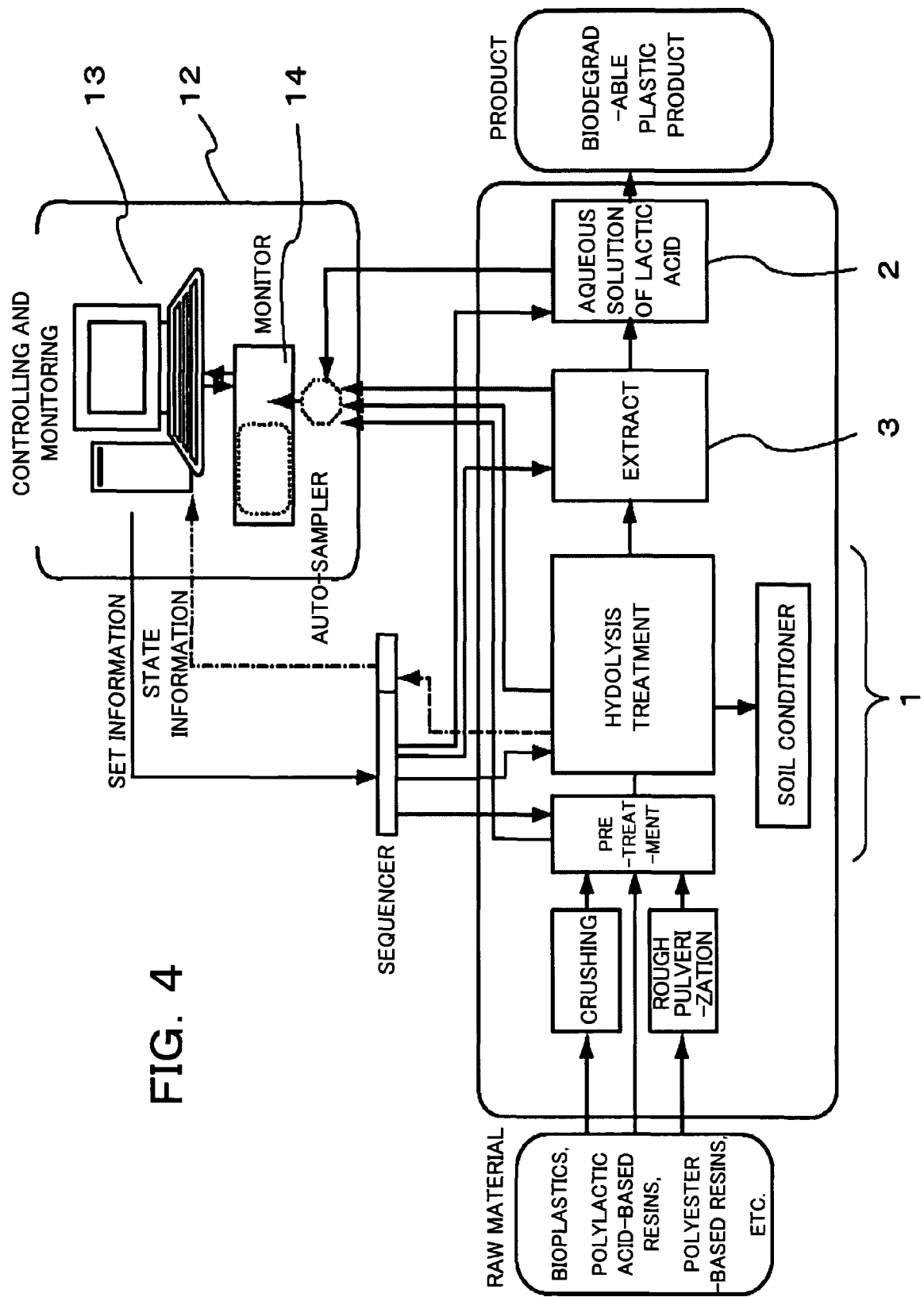
FIG. 4 shows a configuration of a system to execute the method of the present invention.

FIG. 4 illustrates the structure of a system monitoring the progress of hydrolysis reaction occurring in the treatment chamber. A central monitoring room 12 has a computer as a hydrolysis control unit 13. The computer conducts all the controls and conducts control of setting information necessary for the hydrolysis treatment proceeding in the treatment chamber 1, including the power-on of the heater 5, the drive control of the agitation blades 10, the setting of treatment time, the open-close control of valves of pipelines, and the drive control of the circulation pump 4. In addition, using a monitor 14, the computer watches the progress of hydrolysis reaction, the condition of generated crude lactic acid, and the condition of extract obtained in the cooling column 3. The computer further conducts sampling of them.

According to the embodiment, the above apparatus is applied to conduct hydrolysis treatment of the article to be treated containing used polylactic acid resin products. The hydrolysis treatment proceeds in a sequential order of heating-mode treatment and cooling-mode treatment. The method for reclaiming to reclaim the raw materials of polylactic acid resin products using the above apparatus will be described below referring to FIG. 5 and FIG. 1. That type of method is suitable specifically for reclaiming the raw materials of lactic acid-based biodegradable plastics using the waste containing lactic acid-based biodegradable plastics as the article to be treated.

Figure 5:
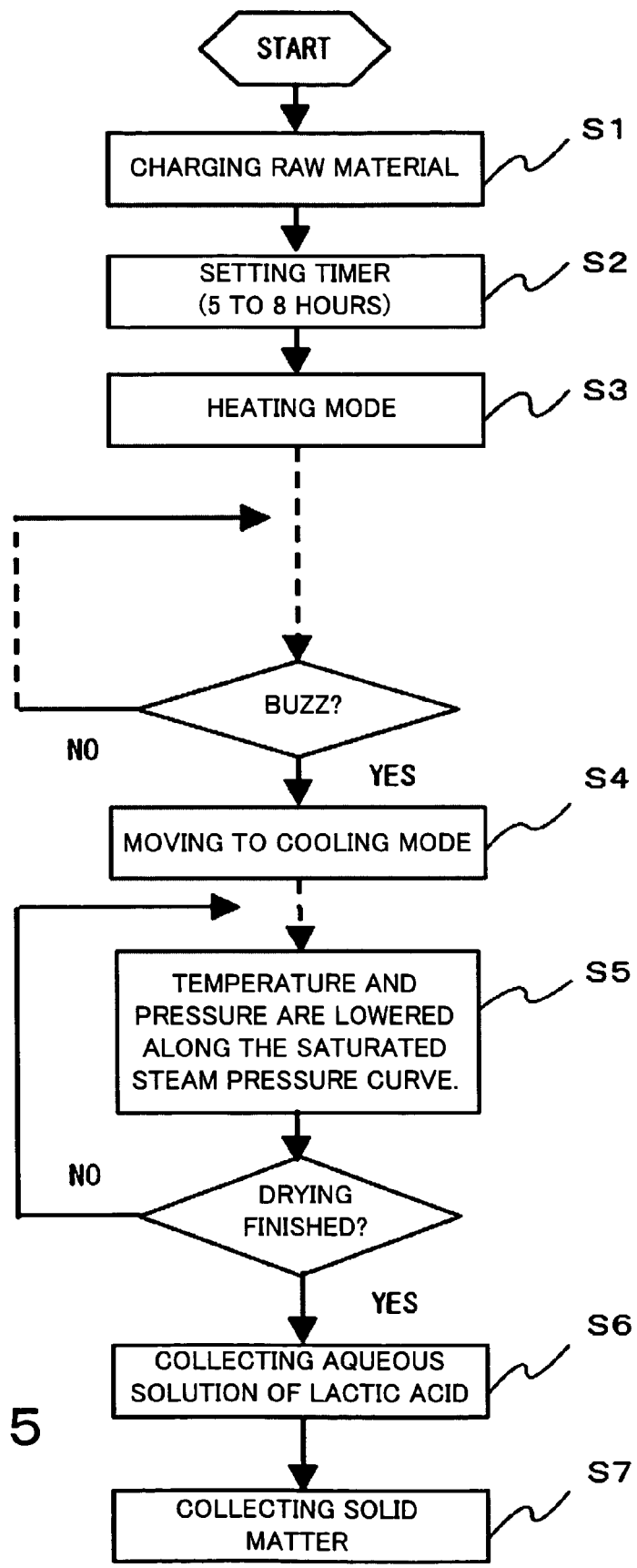
FIG. 5 is a flow diagram of the method of the present invention.

As illustrated in FIG. 5, first the article to be treated is charged into the treatment chamber 1 together with sufficient quantity of water to attain the saturation water vapor pressure, and then the treatment chamber 1 is closed, (Step S1).

After charging the article to be treated into the treatment chamber 1, the charge opening 8 is closed, and a timer is set to apply power to the heater 5, (Step S2). The heating-mode treatment begins while heating inside of the treatment chamber 1 to about 140° C. In the heating-mode treatment, the internal pressure of the treatment chamber 1 is kept to the saturation water vapor pressure at about 140° C. of heating temperature. Once a certain interval (2 seconds, for example), the agitation blades 10 are driven to rotate about one turn to agitate the raw material in the treatment chamber 1.

In that state, while heating inside of the treatment chamber 1 for a certain period, the article to be treated is exposed to the atmosphere of saturated water vapor generated in the treatment chamber 1, thus the hydrolysis reaction proceeds. By the heating-mode treatment, the hydrolysis reaction of the lactic acid-based biodegradable plastics proceeds. Then, the crude lactic acid and the vapor thereof are generated together with water vapor, and the vapor fills the treatment chamber 1. After a predetermined period has passed, the power supply to the heater 5 is cut off to complete the heating-mode treatment, (Step S3).

The time necessary for the hydrolysis treatment of the article to be treated is normally from 5 to 8 hours, though the time depends on the article to be treated and on the capacity of the treatment chamber 1. That is, when the article to be treated is heated in the closed treatment chamber 1 within a temperature range from about 100° C. to 150° C., the biodegradable plastics in the article to be treated can be hydrolyzed within several hours under the saturation water vapor pressure at the set-temperature. The above heating temperature is preferably set specifically to about 140° C. Generally the apparatus of maintaining high temperature and high pressure state becomes difficult and becomes expensive to fabricate with increase in the capacity. Therefore, the treatment temperature is requested to decrease as far as possible. On the other hand, excessively low temperature takes excessively long reaction time. To secure a collection quantity to a certain level while suppressing the cost, the heating temperature is preferably set to about 140° C., as described above.

Then, the timer sets the time of heating-mode treatment of the hydrolysis treatment. In the heating-mode treatment, the vapor-exit opening 7 and the vapor-return opening 6 of the extraction tube 2 are closed. In the state of closing the treatment chamber 1, the article to be treated is heated and pressurized, thus the hydrolysis of article to be treated progresses under the saturation water vapor pressure at the heating temperature. After the set time has passed, buzzer generates notification alarm. Even before the set time, buzzer can generate notification alarm when abnormality in treatment conditions occurs, (temperature abnormality or pressure abnormality).

After the time of heating-mode treatment, set by the timer, has passed, the heating stops, and the treatment moves to the cooling-mode treatment, (Step S4). In the cooling-mode treatment, the temperature inside of the treatment chamber 1 is lowered along the saturation water vapor pressure curve given in FIG. 3 while controlling the pressure and temperature in the treatment chamber 1, (Step S5). In the cooling-mode treatment, the valves of the extraction tube 2 at exit side and return side are opened, and the circulation pump 4 is started to suck the water vapor inside the treatment chamber 1 into the extraction tube 2. Then, the water vapor is guided to pass through the cooling column 3 to let a part thereof condense. The dry air after dried and cooled is recycled to the treatment chamber 1. The water vapor in the treatment chamber 1 is circulated between the cooling column 3 and the treatment chamber 1.

In the cooling-mode treatment, the treatment chamber 1 contains remained solution of crude lactic acid and solid matter such as aggregate mixed in the polylactic acid. The extract which is extracted from the article to be treated and which exists in the vapor is sent to the cooling column 3. The extract is then cooled to condense in the cooling column 3, and is stored in the cooling column 3 as the aqueous solution of crude lactic acid.

The temperature and pressure of the water vapor inside the treatment chamber 1 gradually decrease by the repeated cooling of inside of the treatment chamber 1. After confirming that the temperature and pressure in the treatment chamber 1 are fully decreased, (at least to 100° C. and 1 atm or lower), the drain 11 of the cooling column 3 is opened, thus the aqueous solution of lactic acid extracted in the cooling column 3 is collected in the vessel V1 via the filter 15, (Step S6). At the same time, the drain 11' is opened to collect the solution in the treatment chamber 1 into the vessel V2 via the filter 15. The solid matter is collected from the discharge opening 9, (Step S7).

By filtering the aqueous solution of crude lactic acid collected in the vessels V1 and V2, there are removed the aggregate existing in the polylactic acid resin product, the fine particles of filler, and the printing ink attached to the polylactic acid resin product. As a result, pure lactic acid can be obtained as the saturated aqueous solution of lactic acid monomer and lactic acid oligomer.

For the saturated aqueous solution of lactic acid collected in the individual vessels, further decrease in the liquid temperature induces supersaturation and deposition of lactic acid crystals. Therefore, when the crystals are filtered by a filter, other water-soluble components such as pigment are separated, and further high concentration lactic acid can be collected. That is, in the crystallization stage, only the lactic acid is gathered from the solution, and the separation of the lactic acid from other mixing substances is conducted naturally.

When a substance forms crystal thereof, other substances are rejected, and the simple substance bonds together following a certain rule. As a result, the crystal has very high purity. The purity of crystal is attained by temperature control.

Thus obtained high purity lactic acid is a raw material before polymerizing to the polylactic acid resin, and becomes the raw material of polylactic acid resin products. The solid matter collected from the treatment chamber 1 is mainly polycarbonate, kenaf fiber, or the like used as aggregate, filler, and the like for the polylactic acid resin products. Similar to the liquid component, above solid matter components can be reclaimed and reused.

The aqueous solution of crude lactic acid collected in the vessels V1 and V2 may be used again as the raw material of biodegradable plastics products, and the solid product collected from the treatment chamber 1 may be recycled as the plastics material or may be processed to prepare the soil conditioner. The above embodiment describes an example of using a heater to raise the temperature. For a large system, however, it is more efficient to adopt a boiler to use heated water vapor as the heat source.

The above embodiment applies the method of present invention to the hydrolysis of polylactic acid resin. The present invention, however, is not limited to the hydrolysis of polylactic acid resin (PLA), and can be applied in a quite similar manner also to the hydrolysis of synthetic resins having ester bond in the composition structure thereof, including biodegradable plastics such as polybutylene succinate (PBS), polycaprolactone (PCL), polyhydroxyalkanoate (PHA), and poly-3-hydroxybutyrate (PHB), non-biodegradable plastics originated from petroleum, and specific resins such as polyethylene terephthalate (PET) and nylon 6.

For any of these resins, the raw materials for the resin can be reclaimed by separating the decomposition products of hydrolysis treatment into gas or liquid component and solid component, and by individually collecting them. For example, when PET is hydrolyzed, ethylene glycol is obtained as the liquid component, while terephthalic acid used as the aggregate is obtained as the solid component. Nevertheless, even for a synthetic resin having ester bond in the composition structure thereof, the resins such as polyurethane which generates toxic component by the hydrolysis need a careful handling of them.

EXPERIMENTAL EXAMPLE 1

To confirm the effect of hydrolysis according to the present invention, the following experiment was executed. The experiment used a sample of polylactic acid molded article (polylactic acid molded article "Terramac" (registered trademark), manufactured by UNITICA LTD.). Before the experiment, a sample of the same material was immersed in hot water for 8 hours, then the sample was allowed to stand in air at 200° C. for 2 hours, further the sample was allowed to stand in air at 130° C. under 2.6 atm to test the occurrence of decomposition. The sample did not give decomposition under any of above conditions.

Figure 6:
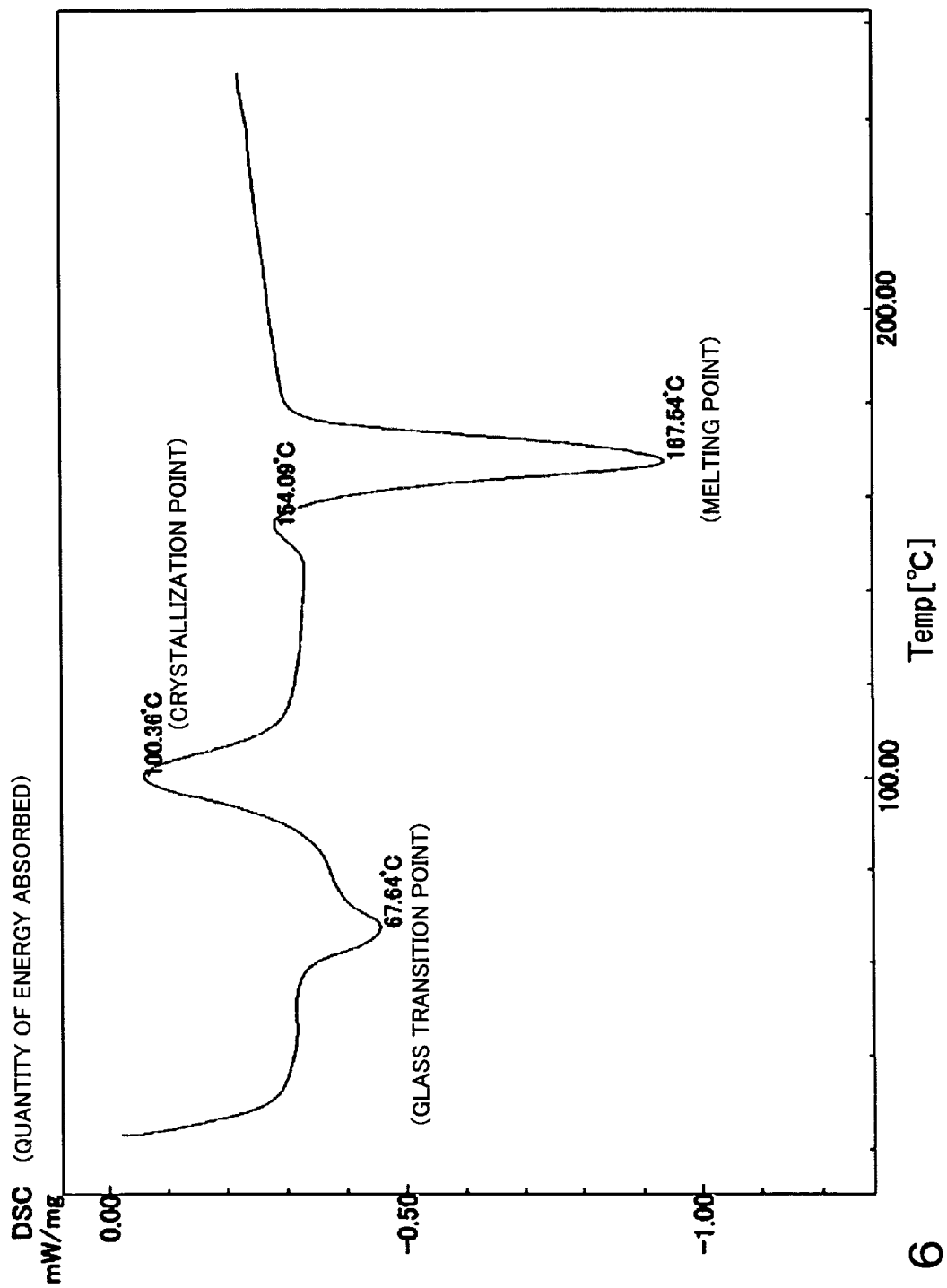
FIG. 6 is a graph showing the relation between the temperature and the quantity of energy absorbed for a polylactic acid resin.

FIG. 6 shows the relation between the temperature and the DSC (quantity of energy absorbed) for the sample of polylactic acid resin molded article ("Terramac" (registered trademark), manufactured by UNITICA LTD.). As seen in FIG. 6, the glass transition point of the sample was 67.64° C., the sample crystallized at 100.36° C., and the sample melted at 167.54° C.

When the temperature exceeded 167° C. which is the melting point of the sample, the saturated vapor pressure exceeded 6 atm, the polylactic acid resin liquefied, and other included components became melting or denaturating, seizing, or the like. Consequently, the setting of the range of treatment temperature from 120° C. to about 160° C. is presumably practical.

Figure 7:
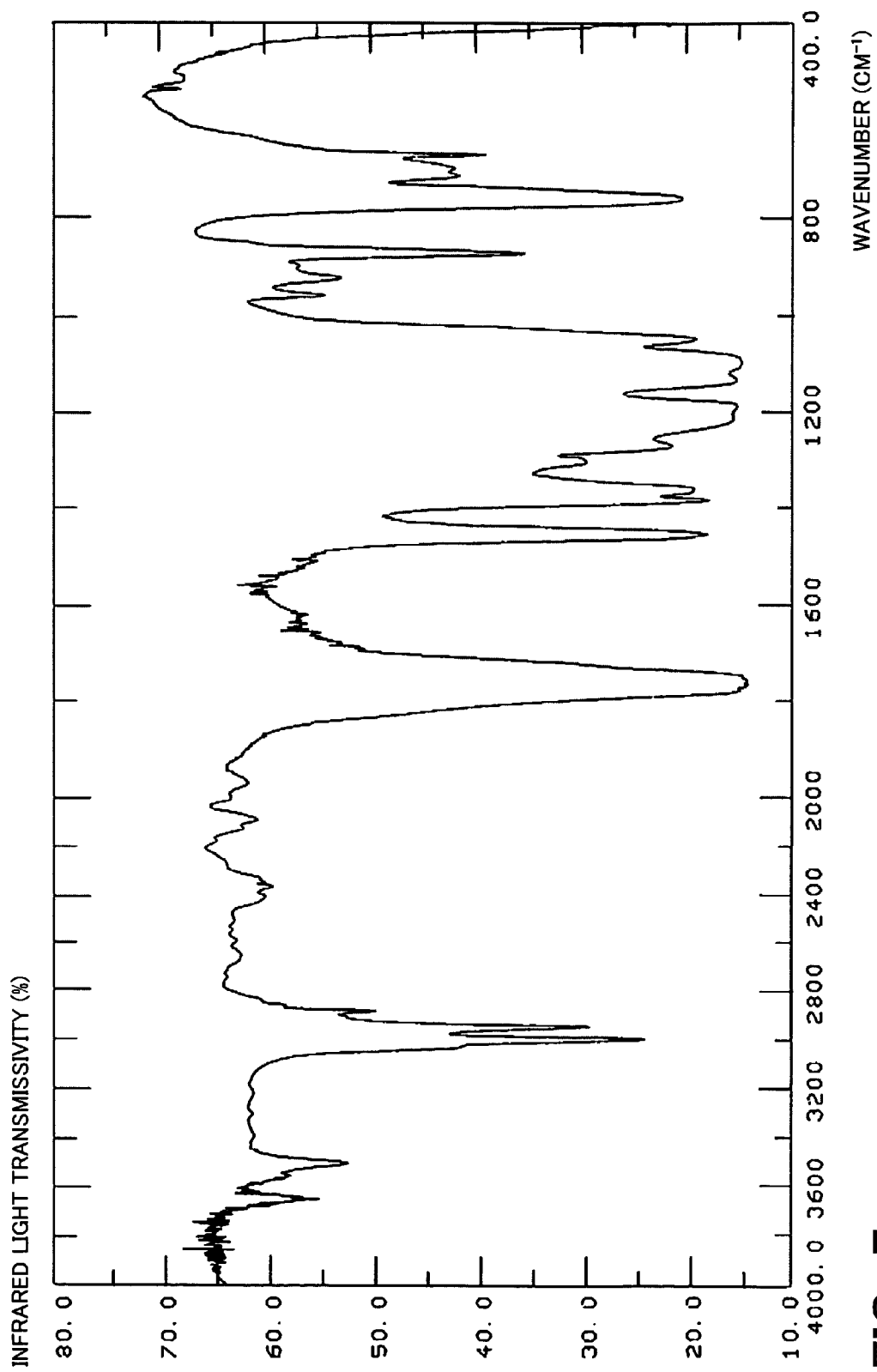
FIG. 7 is a graph of infrared spectroscopic analysis (IR) of a sample before hydrolysis.
Figure 8:
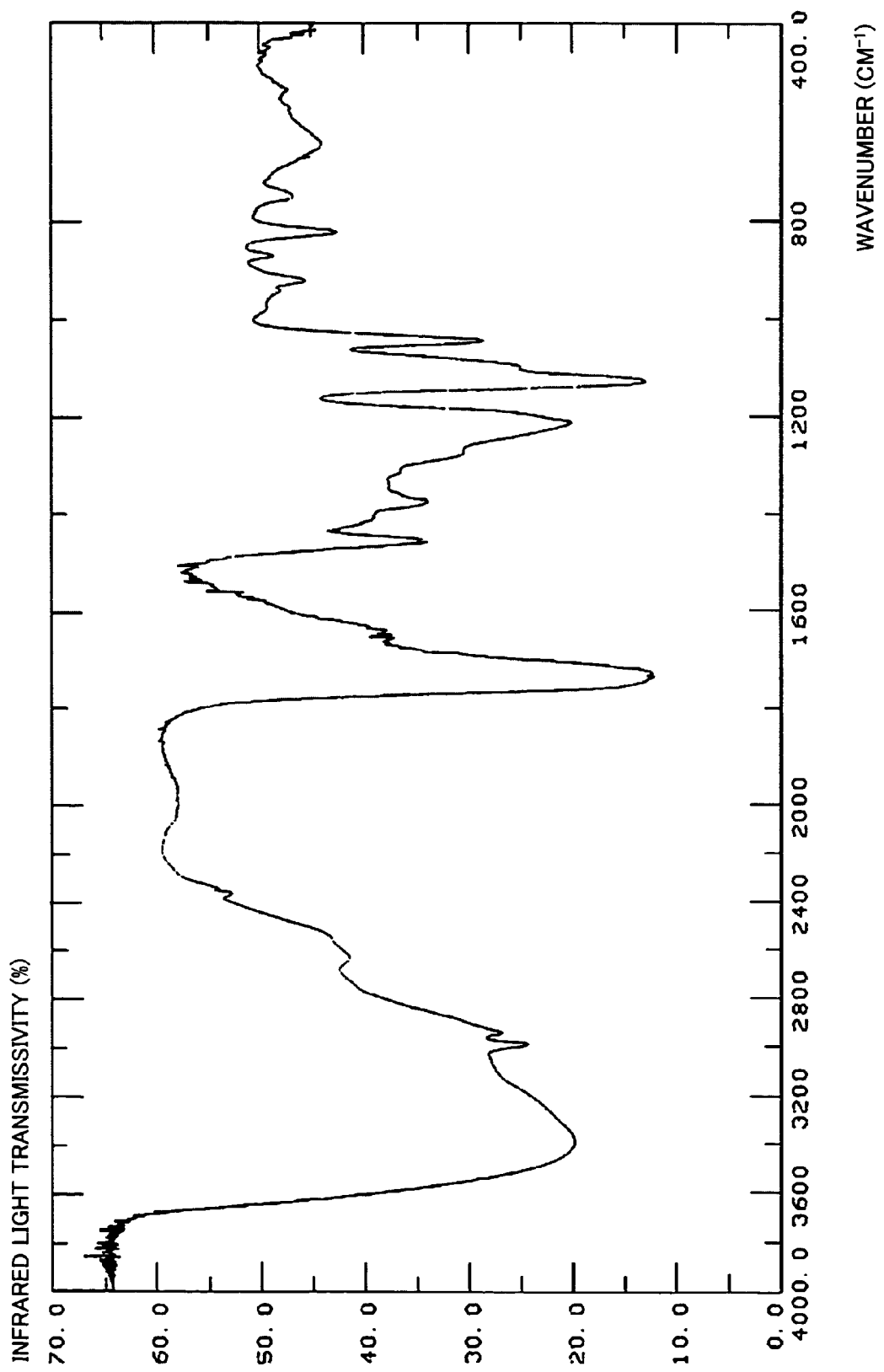
FIG. 8 is a graph of infrared spectroscopic analysis (IR) of the sample after heat treatment of the hydrolysis.

FIG. 7 is a graph of infrared spectroscopic analysis (IR) of a sample before hydrolysis. FIG. 8 is a graph of infrared spectroscopic analysis (IR) of the sample after hydrolysis. For both graphs, the vertical axis is the infrared light transmissivity (%), and the horizontal axis is the wavenumber ($cm^{-1}$). From the waveform in FIG. 7, the sample is judged as polylactic acid resin. From the waveform in FIG. 8, obtained from the sample after hydrolysis, the sample is judged as lactic acid.

Figure 9:
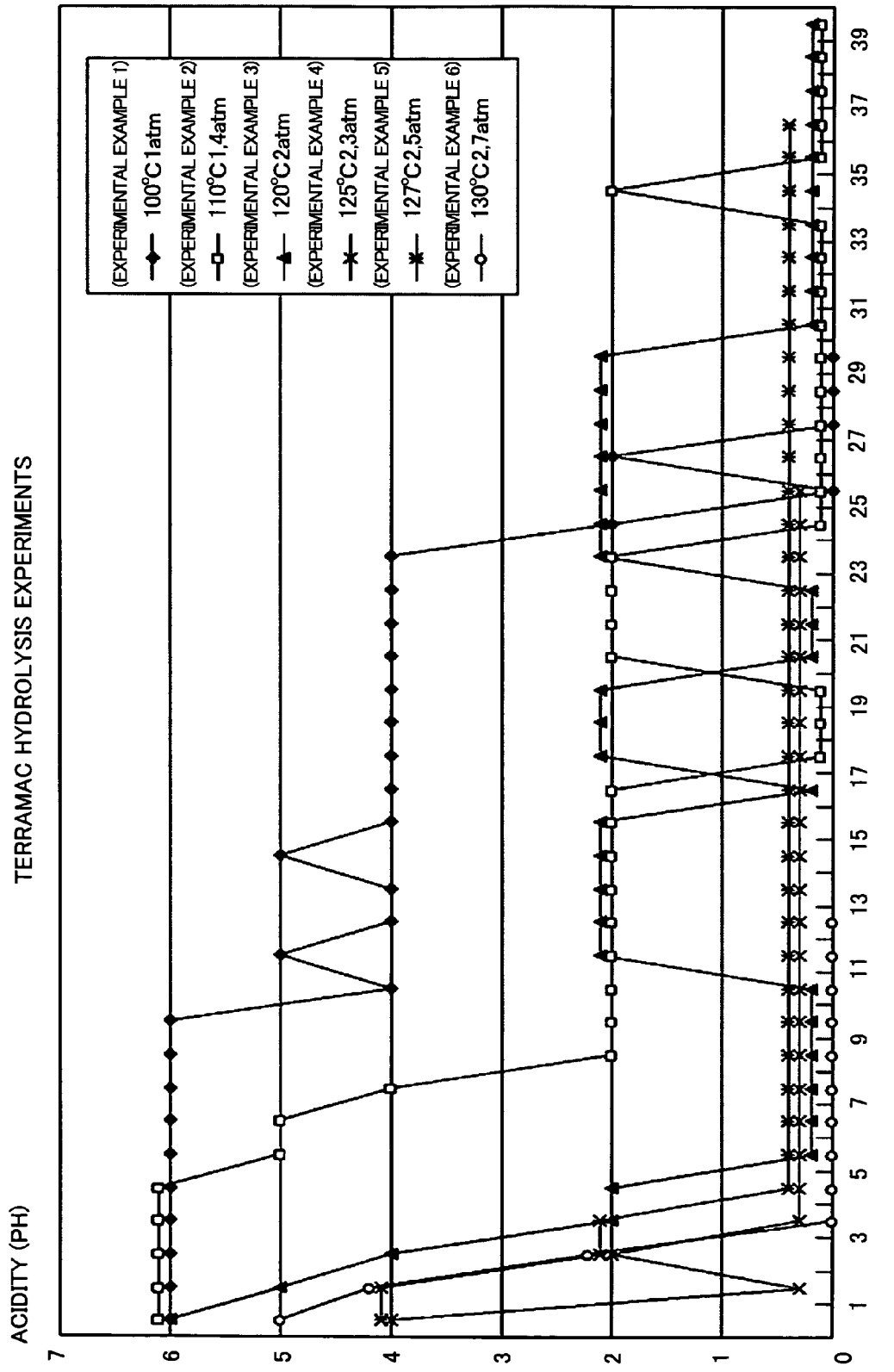
FIG. 9 is a graph showing the results of experiments of hydrolysis treatment for polylactic acid resin moldings without pretreatment.

The above sample was put in a beaker in a state of exposure to atmosphere, and the sample was subjected to hydrolysis treatment without pretreatment in a pressure vessel (Autoclave, IT-2322, manufactured by ALP Corporation). The result is given in FIG. 9. Experimental Examples 1 to 6 shown in FIG. 9 are the results of hydrolysis treatment under the conditions of 100° C. to 130° C. of the heating temperature and 1 to 2.7 atm of pressure in the hydrolysis treatment. Since polylactic acid resin shows strong acidity pH when it is decomposed into lactic acid, the detection of the degree of progress of the hydrolysis reaction was given using a pH sheet litmus paper to visually identify the color.

The experimental result showed that higher temperature and higher pressure increase the speed of progress of the hydrolysis treatment. The maximum heating temperature in the hydrolysis treatment was 130° C. because the upper limit of the heating temperature of the pressure vessel used in the experiments was 130° C.

Figure 10:
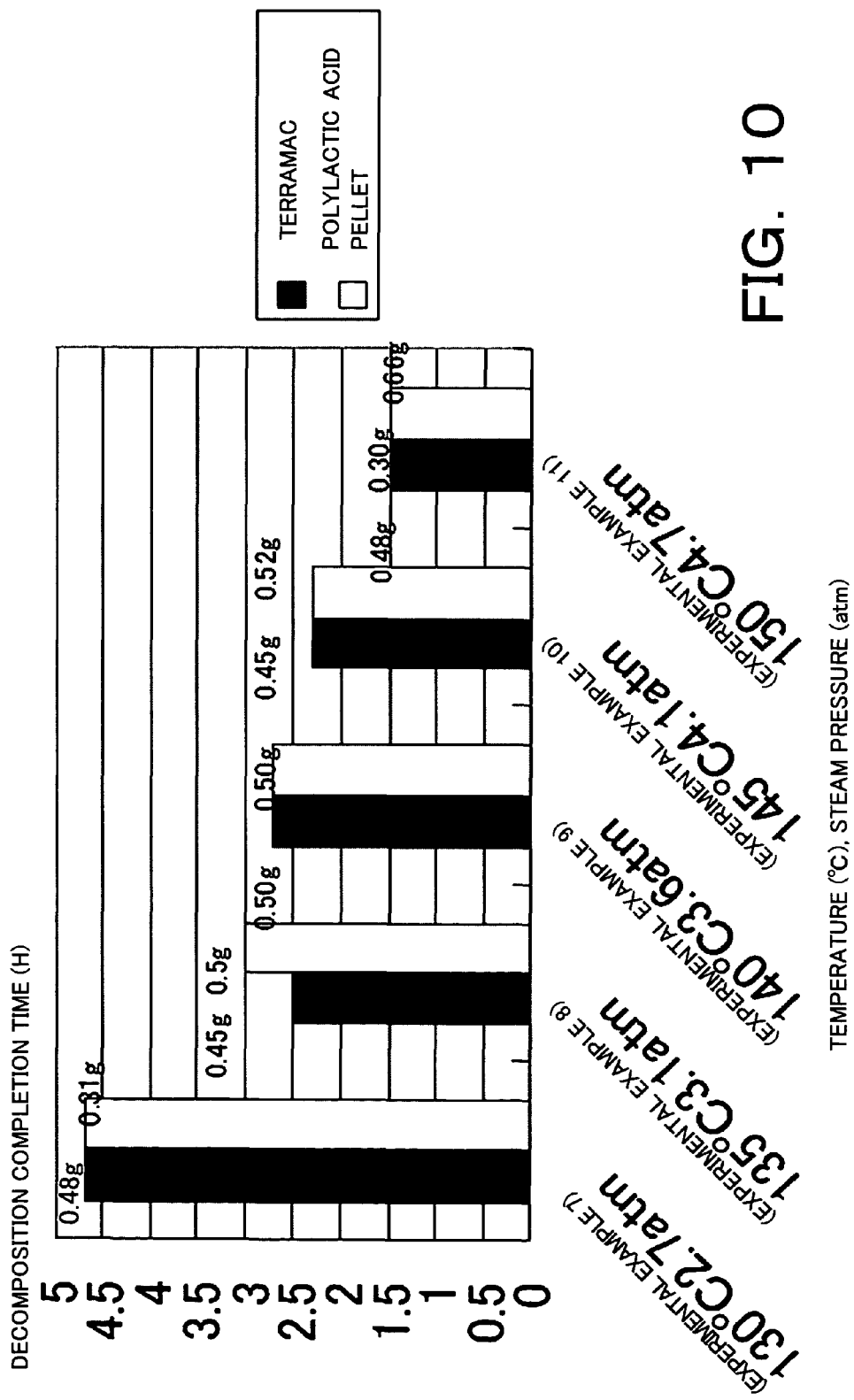
FIG. 10 is a graph comparing the polylactic acid resin molding and the pellet as the material of the molding in terms of the hydrolysis start time and the hydrolysis completion time at hydrolysis treatment under the condition of 130° C. to 150° C. of hydrolysis temperature.

Then, the result of experiment of hydrolysis treatment at 130° C. or higher temperature of treatment is described below. In the experiment, Sample 1 (polylactic acid molded article "Terramac" (regirtered trademark)), and Sample 2 (polylactic acid pellet which is used as a material for the polylactic acid molding) were used. Each of the samples (sample of about 0.5 g) was put separately in a pressure vessel (Hyper-Glaster TEM-V1000N, manufactured by Taiatsu Techno Corporation). As Experimental Examples 7 to 11, the hydrolysis temperature (the saturation water vapor pressure at the temperature) was set to 130° C. (about 2.7 atm), 135° C. (about 3.1 atm), 140° C. (about 3.6 atm), 145° C. (about 4.1 atm), and 150° C. (about 4.7 atm), respectively. For each experimental example, the hydrolysis start time and the hydrolysis completion time for the polylactic acid resin were measured. FIG. 10 shows the hydrolysis completion experimental result.

From the result given in FIG. 10, it was found that, in a temperature range from 130° C. to 150° C., increase in the temperature and pressure decreases the hydrolysis reaction time.

Also it was found that the hydrolysis completion time is between about 4.5 hours and about 1.5 hours from the start of treatment, which shows that the reaction proceeds within relatively short time.

It was found that the reaction time is not much different between Sample 1 (polylactic acid molded article "Terramac" (registered trademark)) and Sample 2 (polylactic acid pellet which is used as a material for the polylactic acid molding).

In particular, the hydrolysis reaction completes at 1.5 hours from the start of treatment at 150° C. of hydrolysis temperature. However, on practical application, sufficient reaction rate is presumably attained by setting the hydrolysis temperature in a range from 135° C. to 150° C.

Consideration on the Result

The above results derived that, in the heating-mode treatment of the hydrolysis treatment, the aqueous solution of lactic acid can be generated by the reaction between the polylactic acid resin and water vapor by adding a sufficient quantity of water to fill the treatment chamber with saturated vapor pressure under the saturated vapor pressure at a temperature ranging from about 130° C. to 150° C.

Embodiment 2

Although the article to be treated begins to be heated in the hydrolysis treatment in the above embodiment, it can be applied a pretreatment to be heated before the hydrolysis treatment. According to this embodiment, before conducting the hydrolysis treatment of article to be treated containing polylactic acid resin, the pretreatment is given, followed by the hydrolysis treatment under the saturation water vapor pressure. As a result of the pretreatment, the hydrolysis reaction is accelerated, and the polylactic acid resin can be decomposed into lactic acid even under a relatively low saturation water vapor pressure near the pretreatment temperature of 100° C. In addition, the time necessary to completely decompose the polylactic acid resin under the same treatment condition of temperature can be significantly shortened.

According to this embodiment, the pretreatment is a treatment in which the polylactic acid resin is heated to around the crystallization temperature of polylactic acid under an environment of no adding water. The hydrolysis treatment is a treatment applying hydrolysis to the polylactic acid resin as the article to be treated.

According to this embodiment, the above apparatus is used to conduct the hydrolysis treatment of the article to be treated containing polylactic acid resin, such as the waste containing lactic acid-based biodegradable plastics. The most important thing in the reclaiming treatment of waste is to minimize the energy (cost) necessary for the reclaiming treatment. In the reclaiming treatment of lactic acid-based biodegradable plastics according to this embodiment, a critical issue is how to minimize the treatment temperature, the treatment pressure, and the treatment time.

The treatment time can be decreased by applying the hydrolysis treatment after the pretreatment to crystallize the polylactic acid. It was found that the hydrolysis for the crystallized polylactic acid can be conducted in a time shorter than that for non-crystallized one by crystallizing the polylactic acid in amorphous state under the same temperature condition (such as 140° C.).

Figure 11:
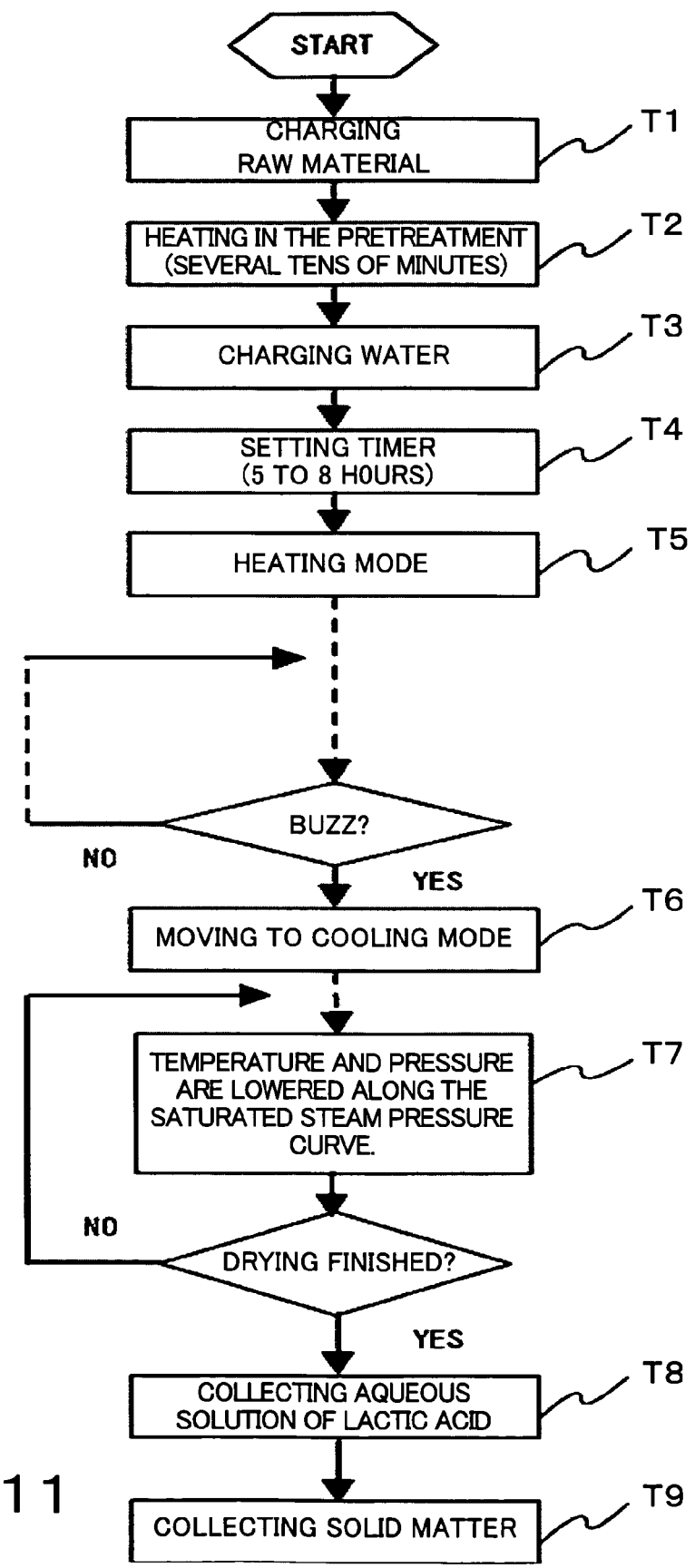
FIG. 11 is a flow diagram of the method of the present invention.

In this embodiment, the above apparatus is used, and pretreatment for an article to be treated containing polylactic acid resin is conducted before the hydrolysis treatment. Then, the heating-mode treatment of the hydrolysis treatment and then the cooling-mode treatment of the hydrolysis treatment are successively conducted. The reclaiming method to reclaim the raw materials of lactic acid-based biodegradable plastics by treating the waste containing lactic acid-based biodegradable plastics using the above apparatus is described below referring to FIG. 11 and FIG. 1.

First, the article to be treated composed of waste containing lactic acid-based biodegradable plastics is charged into the treatment chamber 1, (Step T1), and then the charge opening 8 is closed. As the pretreatment, inside of the treatment chamber 1 is heated to a temperature near the crystallization point of the polylactic acid resin for about 30 minutes or more, (Step T2). After that, the hydrolysis treatment starts, and water is charged into the treatment chamber 1 in a quantity of 20% of the total weight of the article to be treated, (Step T3). The charge opening 8 is closed, and the timer is set, and then the electric power is applied to the heater 5, (Step T4). Next, the heating-mode treatment begins while heating inside of the treatment chamber 1 to a temperature range from about 100° C. to 150° C. In the heating-mode treatment, the internal pressure of the treatment chamber 1 is kept to the saturation water vapor pressure at the heating temperature of the hydrolysis treatment, being set in the range from 100° C. to 150° C. Once a specific interval (such as 2 seconds), the agitation blades 10 are driven to rotate by about one turn to agitate the raw materials in the treatment chamber 1.

In that state, the article to be treated is exposed to the atmosphere of saturated water vapor generated in the treatment chamber 1 to conduct hydrolysis reaction while heating the chamber 1 for a certain period of time. By the heating-mode treatment, the hydrolysis reaction of the lactic acid-based biodegradable plastics proceeds to generate crude lactic acid and its vapor together with water vapor. The vapor fills the treatment chamber 1. After a predetermined time has passed, the electric power to the heater 5 is cut off to complete the heating-mode treatment, (Step T5).

The time necessary for the hydrolysis treatment of the article to be treated is normally 5 to 8 hours, though the time depends on the article to be treated and on the capacity of treatment chamber 1. That is, when heating is given in the closed treatment chamber 1 in a temperature range from about 100° C. to 150° C., the biodegradable plastics in the article to be treated can be hydrolyzed within several hours under the saturation water vapor pressure at the set temperature.

According to the hydrolysis treatment, the article to be treated is heated to the treatment temperature together with the charged water in a state of closing the treatment chamber 1, and the hydrolysis of the article to be treated is progressed under the saturation water vapor pressure at the temperature. The elapse of the set time is notified by buzzer. Even before the set time, buzzer can generate notification alarm when abnormality of treatment conditions occurs, (temperature abnormality or pressure abnormality).

When the hydrolysis treatment time set by the timer has passed, the heating is stopped, and the chamber is cooled in that state, (Step T6). After completed the cooling, the saturated aqueous solution of lactic acid which is dropped or held to gather at lower part at lower part of the treatment chamber 1 is collected.

At the point of completion of treatment, the aqueous solution of crude lactic acid and other solid matter (aggregate and the like mixed in the polylactic acid) are completely separated in the treatment chamber 1, and are collected respectively.

Once the sufficient decrease in the temperature and pressure in the treatment chamber 1 is confirmed, (at least to 100° C. and 1 atm or below), the drain 11' is opened to collect the aqueous solution of lactic acid in the treatment chamber 1 into the vessel V2. In addition, the solid product is collected through the discharge opening 9, (Step T9). The aqueous solution of crude lactic acid collected in the vessel V1 and the vessel V2 becomes again the raw material of biodegradable plastics products. The solid product collected from the treatment chamber 1 is recycled or discarded depending on the base material.

According to this embodiment, the heater is applied to directly heat the treatment chamber and the water at a time. In a large system, however, it is more efficient that a separately prepared boiler or the like is used to generate heated water vapor, which heated water vapor is then fed to the treatment chamber. Alternatively, depending on the location of the treatment facilities, heat of combustion of gas, petroleum, or the like may be utilized instead of electric power. In the future, it is possible to fabricate a treatment apparatus giving high energy efficiency utilizing both the electric energy generated from the fuel cells and the waste heat by structuring a system using fuel cells.

Figure 12:
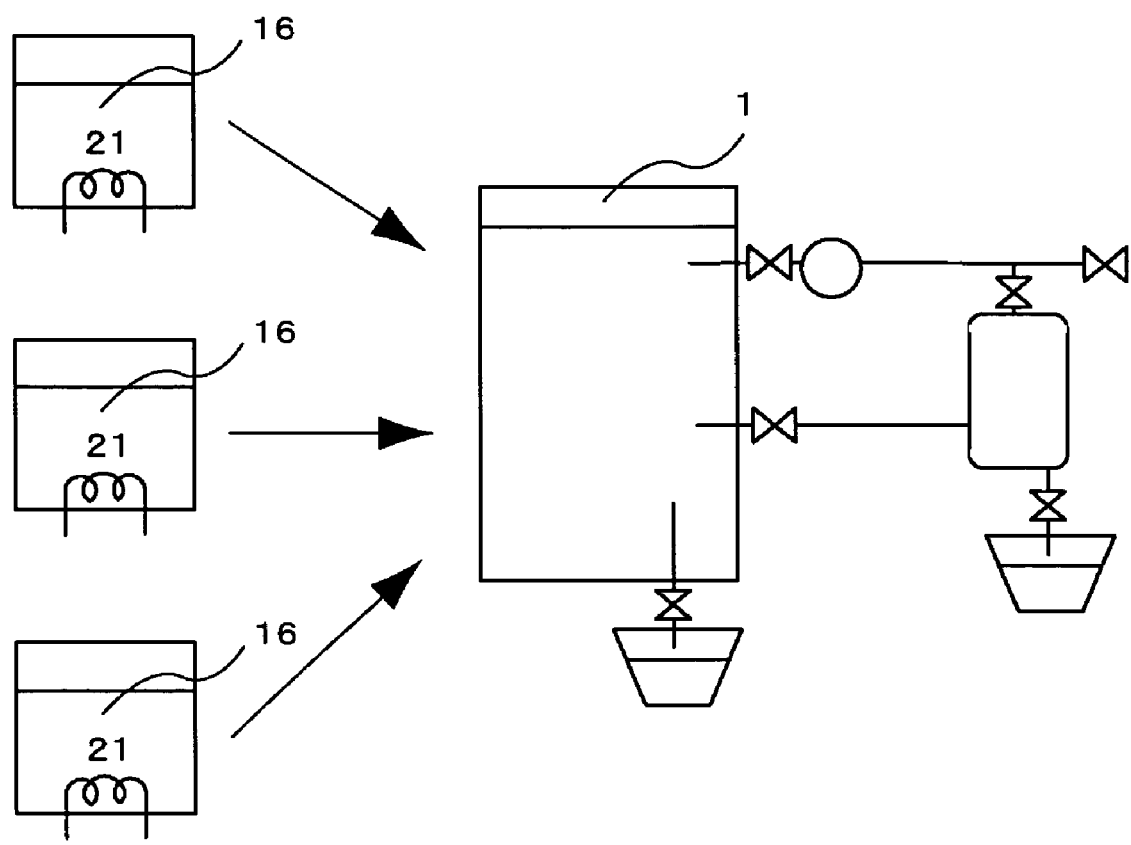
FIG. 12 shows an example in which treatment chambers for the pretreatment and a treatment chamber for the heating treatment being used, respectively.

The above embodiments conduct pretreatment of article to be treated containing polylactic acid resin in the treatment chamber 1 for the hydrolysis treatment. The pretreatment, however, is not necessarily given in the treatment chamber for the hydrolysis treatment. A treatment chamber for the pretreatment can specifically be separately prepared, and the pretreatment of the article to be treated can be given in a treatment chamber 16 for the pretreatment, as shown in FIG. 12, then the crystallized polylactic acid resin discharged from the treatment chamber 16 for the pretreatment can be charged into the treatment chamber 1 for the hydrolysis treatment, thus the hydrolysis treatment in the treatment chamber 1 for the hydrolysis is conducted.

The practical advantage of specifically preparing the treatment chamber 16 for the pretreatment is described below referring to an example. For instance, the treatment chambers 16 for the pretreatment are installed at the places of generating the polylactic acid resin waste, such as convenience stores and restaurants, and the pretreatment is executed at the places of generating the polylactic acid resin waste to decrease the volume of article to be treated. From the respective treatment chambers 16 which are installed at distributed places of generating the polylactic acid resin waste, the pretreated crystallized polylactic acid resins are collected to the central treatment facility. Thus collected crystallized polylactic acid resins are subjected altogether to the hydrolysis treatment in the large treatment chamber 1 for the hydrolysis treatment installed at the central treatment facility. The operation increases the treatment efficiency.

EXPERIMENTAL EXAMPLE 2

To confirm the effect of hydrolysis according to this embodiment, the following experiment was executed. The experiment used a sample of polylactic acid molded article (polylactic acid molded article "Terramac" (registered Trademark), manufactured by UNITICA LTD.). Before entering the experiment, the sample was immersed in hot water for 8 hours, then the sample was allowed to stand in air at 200° C. for 2 hours, further the sample was allowed to stand in air at 130° C. under 2.6 atm to test the occurrence of decomposition. The sample did not give decomposition under any of above conditions. FIG. 6 shows the relation between the temperature and the DSC (quantity of energy absorbed) for the sample.

According to FIG. 6, the glass transition point of the sample is 67.64° C. the sample crystallizes at 100.36° C., and the sample melts at 167.54° C. Based on the fact, it was judged that the temperature of the pretreatment slightly above the melting point is applicable, and that the pretreatment needs a temperature of substantially 170° C. or below and of at least at or higher than 100° C. which is the crystallization point. Higher temperature of pretreatment presumably gives higher crystallization speed, and it is readily presumed that higher temperature of pretreatment more accelerates the succeeding hydrolysis reaction. Since actual experiment confirmed the sufficient effect of the pretreatment even at 100° C. for about 30 minutes, there is presumably no reason of advantage of high temperature treatment.

When the pretreatment temperature exceeds 167° C. which is the melting point of the sample, polylactic acid resin liquefies. As a result, as shown in FIG. 12 for example, when the article to be treated is collected in the treatment chamber 1 for the pretreatment, and when the hydrolysis treatment is given in the treatment chamber 1 for the hydrolysis treatment in the central treatment apparatus, the handling of article to be treated becomes troublesome. To avoid the troublesome handling, it is considered practical that the practical pretreatment temperature is set in a range from the crystallization point (about 100° C. in this example) to the melting point (167.54° C. in this example), specifically setting the upper limit of the treatment temperature to the temperature at which the article to be treated keeps the crystallized state, (about 150° C.). The set temperature range of pretreatment from 100° C. to 150° C. is an example for the case of the sample "Terramac", and is not common to all the polylactic acid products. Nevertheless, since the sample has no special structure, the adequate pretreatment temperature range for other polylactic acid resin molded articles is estimated not much different from the pretreatment temperature range suitable for the sample. Therefore, the pretreatment temperature range from 100° C. to 150° C. is expected to be applicable as the pretreatment temperatures for general polylactic acid resin molded articles.

Figure 13:
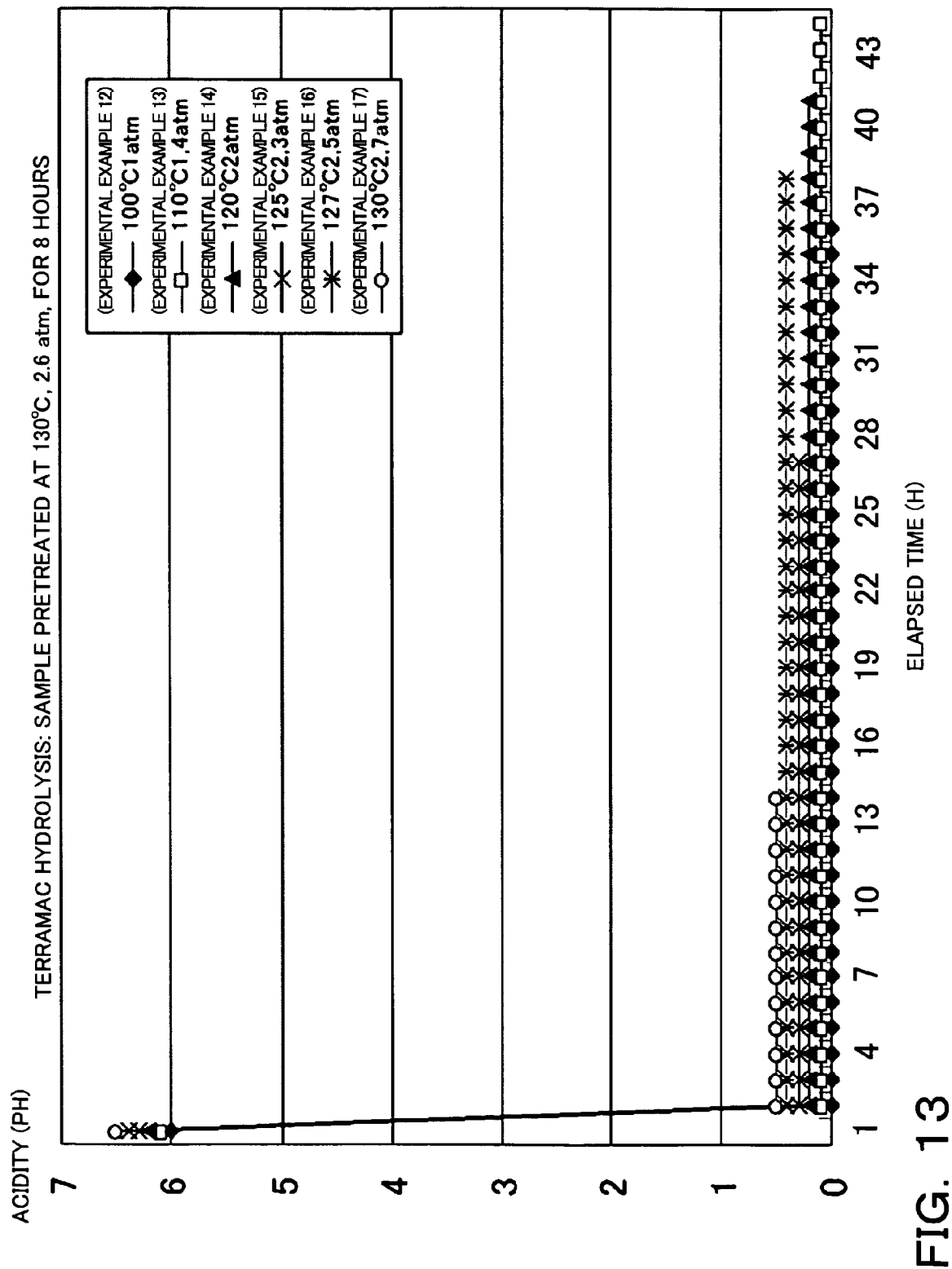
FIG. 13 is a graph showing the results of experiments applying hydrolysis treatment to polylactic acid resin moldings after the pretreatment.

Experimental Examples 12 to 17 shown in FIG. 13 are the results of experiments executed by applying pretreatment under the conditions of 130° C. of heating temperature and 2.6 atm of pressure for 8 hours for the pretreatment, followed by applying the hydrolysis treatment under the conditions of 100° C. to 130° C. of heating temperature and 1 to 2.7 atm of pressure for the hydrolysis treatment. According to the results of the experiments, the hydrolysis began immediately after beginning the hydrolysis treatment for all the samples. The phenomenon suggests that the pretreatment before the hydrolysis treatment for the sample does not need high temperature and high pressure, and that the substantial pretreatment temperature in the experiments is presumably sufficient at 130° C.

Figure 14:
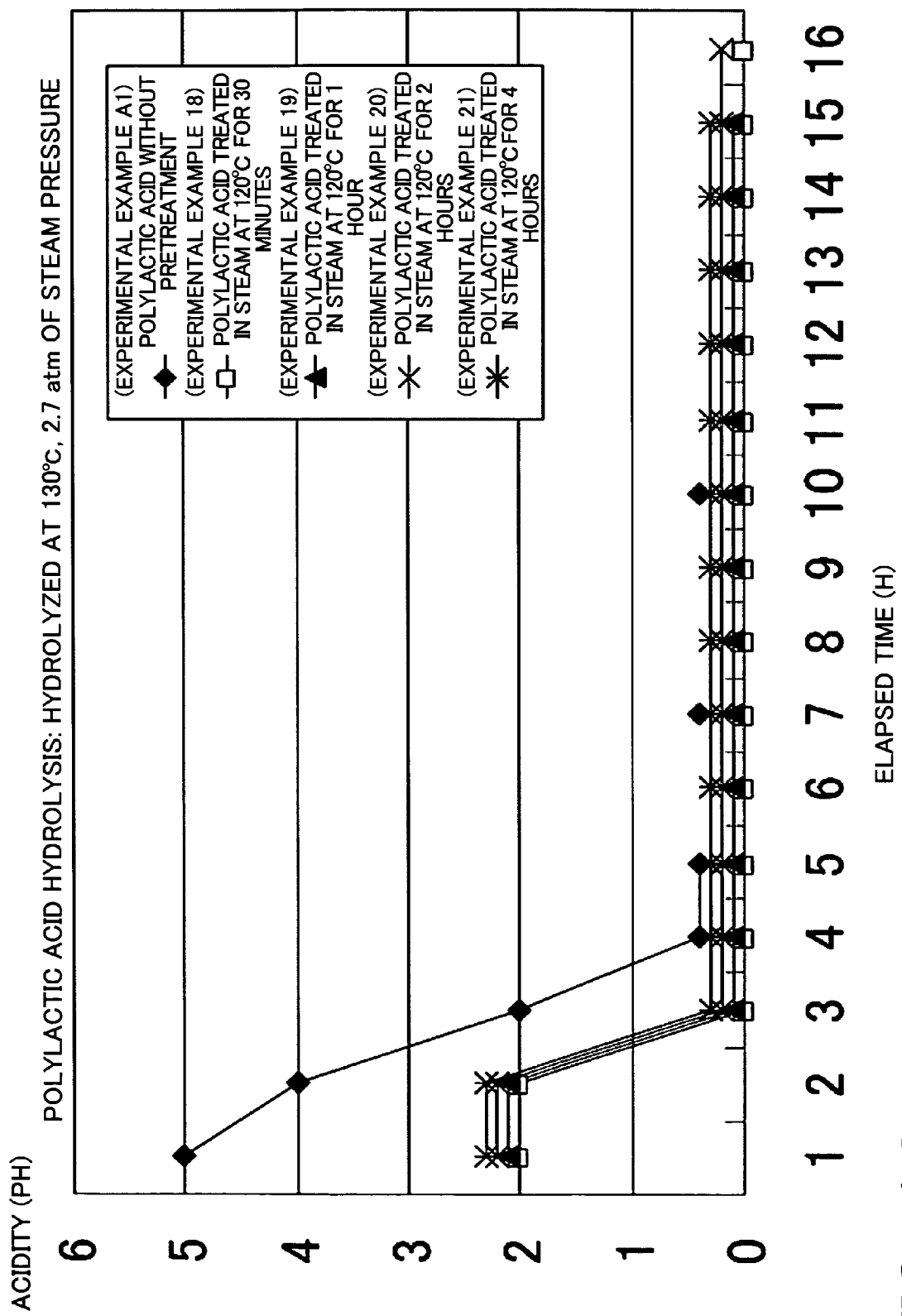
FIG. 14 is a graph comparing the experimental example for polylactic acid resin moldings subjected to hydrolysis treatment without pretreatment and the experimental example therefor subjected to hydrolysis treatment after pretreatment.

FIG. 14 is a graph showing the comparison, using a pellet of polylactic acid resin as the sample, between Experimental Example A1 which conducted hydrolysis treatment for the sample without applying pretreatment and Experimental Examples 18 to 21 which conducted hydrolysis treatment after the pretreatment at 120° C. of heating temperature for 30 minutes to 4 hours. For all of Experimental Example A1 and Experimental Examples 18 to 21, the hydrolysis treatment was given at 130° C. of heating temperature under 2.7 atm of water vapor pressure for the hydrolysis treatment. The experimental results showed that Experimental Example A1 needed about 4 hours to begin the hydrolysis of polylactic acid pellet, and that Experimental Examples 18 to 21 which executed the pretreatment began the hydrolysis of polylactic acid pellet within 3 hours at the maximum. The result was independent of the length of the pretreatment time. Consequently, it was found that the pretreatment is satisfactorily performed with the condition of heating temperature of 120° C. or above and 30 minutes for the pretreatment, at least judged from the result given in FIG. 14.

Figure 15:
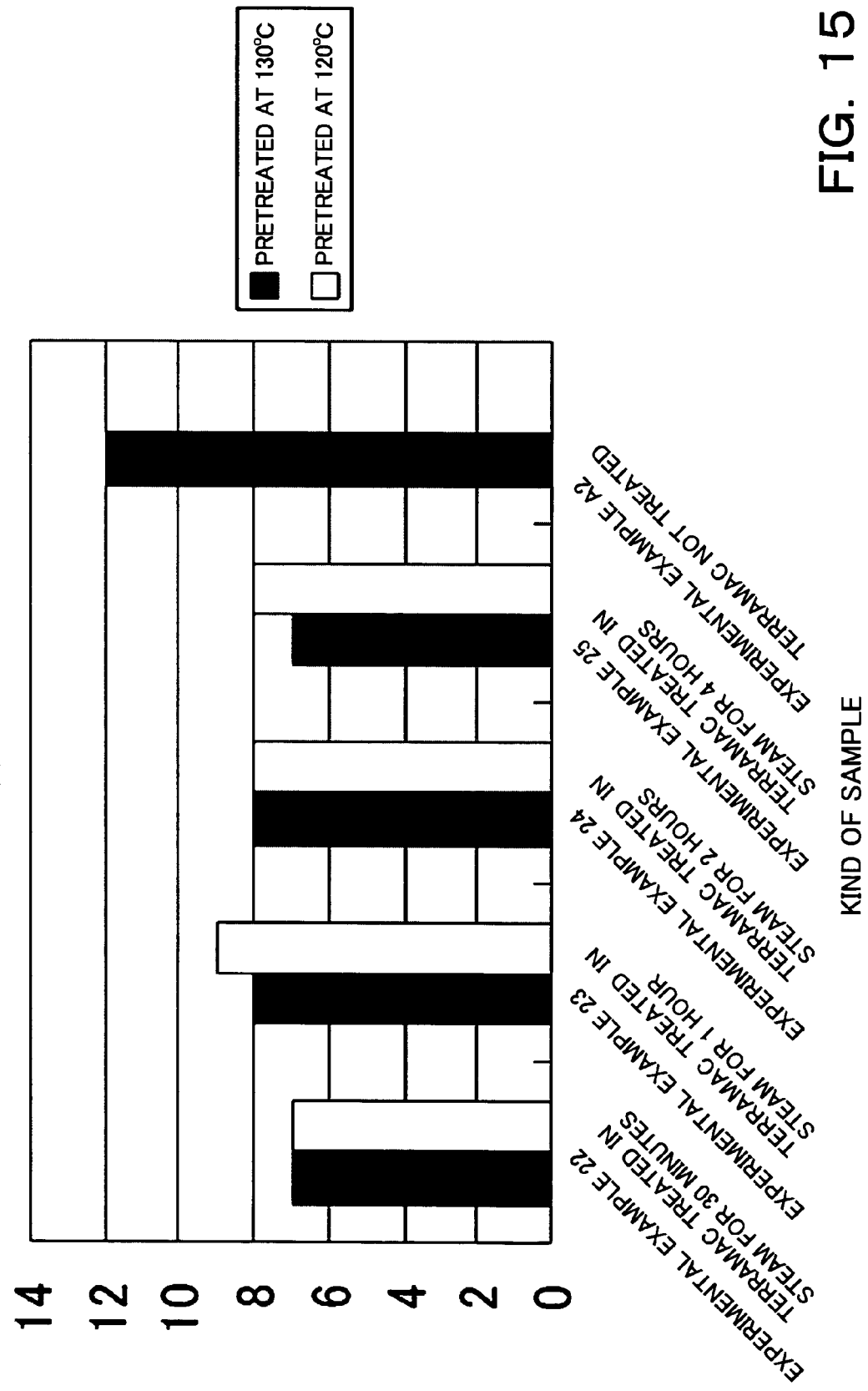
FIG. 15 is a graph showing the difference in the hydrolysis completion time for the hydrolysis treatment with varied conditions of pretreatment.

Next, the sample pretreatment was conducted setting the pretreatment temperature to 120° C. and 130° C., respectively, and varying the pretreatment time to 30 minutes, 1 hour, 2 hour, and 4 hour. Then, the hydrolysis treatment was applied under the condition of 130° C. of the treatment temperature and 2.7 atm of the water vapor pressure. For the conducted Experimental Examples 22 to 25, and Experimental Example A2 which conducted hydrolysis treatment under the same condition without giving the pretreatment, the time required to reach the decomposition and melting was measured. The result is shown in FIG. 15. According to the experimental result, as seen in FIG. 15, Experimental Example A2 which conducted no pretreatment required 12 hours until the completion of decomposition and melting. To the contrary, Experimental Examples 22 to 25 completed the sample decomposition and melting within about 7 to 9 hours. It was judged that there is no significant difference in the result between 120° C. and 130° C. of pretreatment temperature, and that taking a long time for the pretreatment is not necessarily required. Also from the result, it is concluded that the pretreatment at 120° C. for 30 minutes is sufficient.

Figure 16:
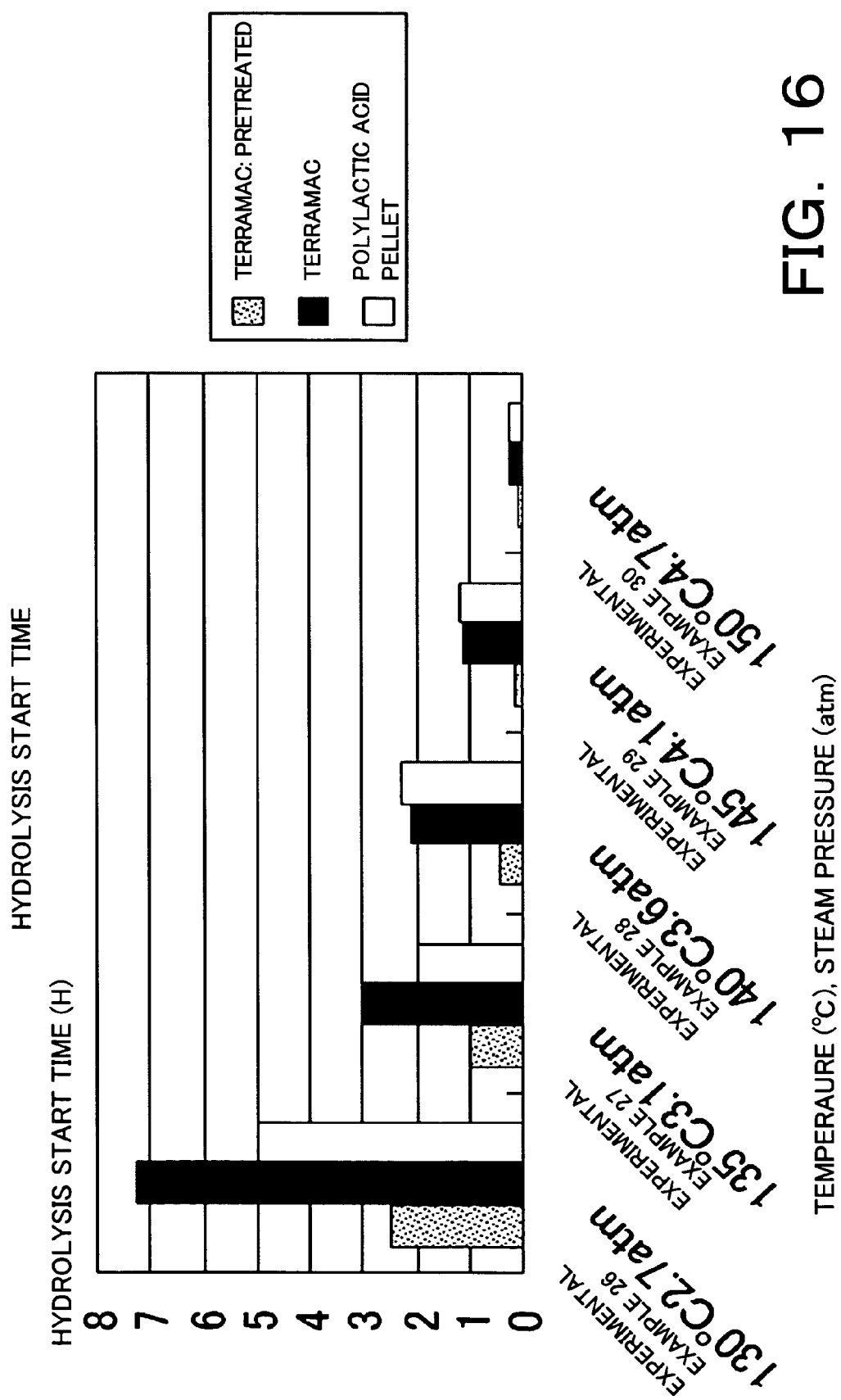
FIG. 16 is a graph comparing the polylactic acid resin molding and the pellet as the material thereof in terms of the hydrolysis start time for the hydrolysis treatment under the condition of 130° C. to 150° C. of hydrolysis temperature.

Furthermore, hydrolysis treatment was conducted at 130° C. or higher treatment temperature after the pretreatment at 130° C. of treatment temperature. The experimental result is described below. In the experiment, Sample 1 (polylactic acid molded article with pretreatment, "Terramac" registered trademark)), Sample 2 (polylactic acid molded article without pretreatment, "Terramac" (registered trademark)), and Sample 3 (polylactic acid pellet which is a material for the polylactic acid molding) were used. Each of the samples (sample of about 1 g) was separately placed in a pressure vessel (Hyper-Glaster TEM-V1000N, manufactured by Taiatsu Techno Corporation). The hydrolysis temperature (water vapor pressure at that moment) of Experimental Examples 26 to 30 was set to 130° C. (2.7 atm), 135° C. (3.1 atm), 140° C. (3.6 atm), 145° C. (4.1 atm), and 150° C. (4.7 atm), respectively. The hydrolysis start time for the polylactic acid resin was measured. The experimental result is given in FIG. 16. The result given in FIG. 16 revealed that the hydrolysis start time becomes significantly short for Sample 1 with pretreatment, and that, in particular, the hydrolysis reaction begins instantaneously at 150° C. of hydrolysis temperature. Since, however, the hydrolysis treatment can be completed within 1 hour even at temperatures from 135° C. to 140° C., it is judged that, in the practical application stage, setting the hydrolysis temperature in a range from 135° C. to 140° C. is sufficient for the practical applications. For all the experimental examples, the hydrolysis reaction completed within about 20 to 30 minutes after beginning the hydrolysis.

Consideration on the Result

The above results derived the finding that the pretreatment is given preferably to heat the polylactic acid resin to a temperature of at least around the crystallization temperature of the polylactic acid resin, or to a temperature at or higher than the crystallization temperature thereof, with an upper limit of a temperature at or below the melting point of the polylactic acid resin. In addition, it was found that normally the heating is preferably done to a temperature within a range from 100° C. to 167° C. Furthermore, the heating-mode treatment of hydrolysis treatment succeeding from the pretreatment is conducted by adding a sufficient quantity of water to fill the treatment chamber with saturation water vapor pressure, thus the polylactic acid resin reacts with the water under the saturation water vapor pressure at a temperature ranging from about 100° C. to 150° C. Consequently, aqueous solution of lactic acid is generated.

Furthermore, to apply pretreatment to the polylactic acid resin not only means the acceleration of the reaction of hydrolysis treatment in the succeeding stage but also gives significant meaning for the separation of plastics. That is, the polylactic acid resin subjected to pretreatment considerably increases the brittleness so that the resin can be pulverized between a pair of rollers. Most of other synthetic resins are only deformed under crushing between rollers, and they are not pulverized. Therefore, if the synthetic resin waste is once heated to a temperature of 100° C. to 130° C. level, and then is fed in between rollers, the polylactic acid resin becomes powder, and is separated by size from other synthetic resins. Thus, only the powdered polylactic acid resin can be taken out to conduct the hydrolysis treatment.

Embodiment 3

Figure 17:
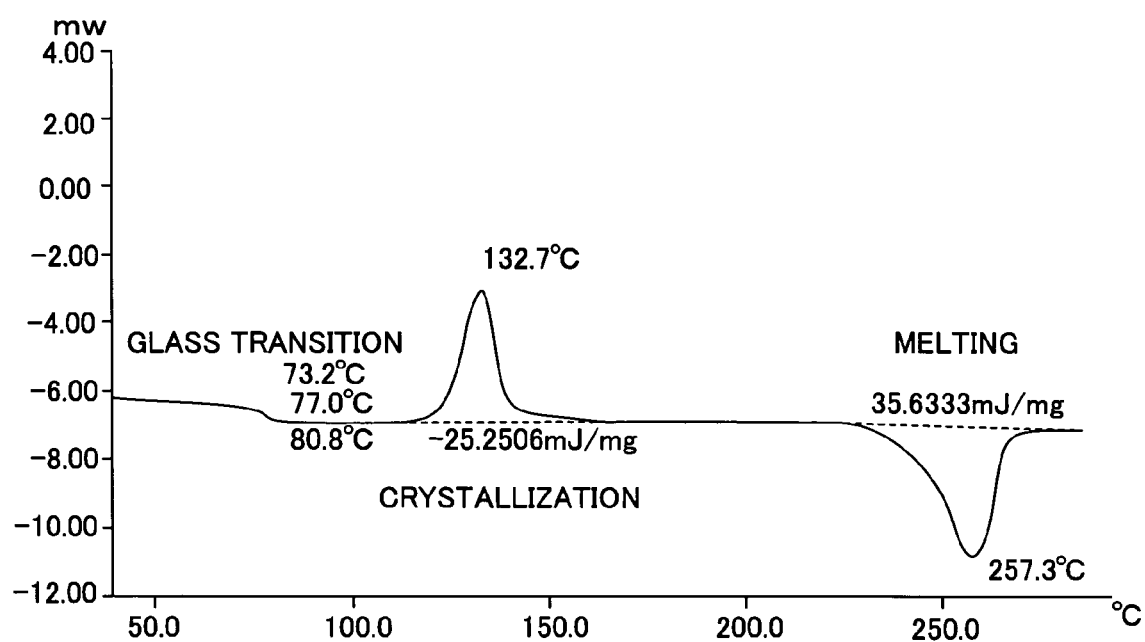
FIG. 17 is a DSC graph of PET.

Although in the above embodiments, polylactic acid resin products are treated as the article to be treated, the article to be treated may be a product formed by polyethylene terephthalate (hereinafter referred to simply as PET). FIG. 17 is a DSC graph of PET. As seen in FIG. 17, the DSC graph of PET gives the exothermic peak at 132.7° C. and the endothermic peak at 257.3° C. That is, the crystallization temperature of PET is 132.7° C., and the melting point thereof is 257.3° C.

EXPERIMENTAL EXAMPLE 3

To confirm the effect of hydrolysis for PET product, the following experiment was conducted. In the experiment, the experimental apparatus of the visual high temperature and high pressure reactor (manufactured by Taiatsu Techno Corporation) is adopted to bring the sample at a specified temperature and pressure. The infrared spectroscopic analyzer (manufactured by JASCO Corporation) is adopted for an analyzer. A transparent flake of PET bottle was used as the article to be treated, and the experiment was given under two conditions. First, the PET sample was placed on a stainless steel mesh on a Petri dish. Then, the decomposition of PET sample was given at 180° C. under 9.9 atm for 10 hours. The resulted product was collected to give IR analysis.

Figure 18:
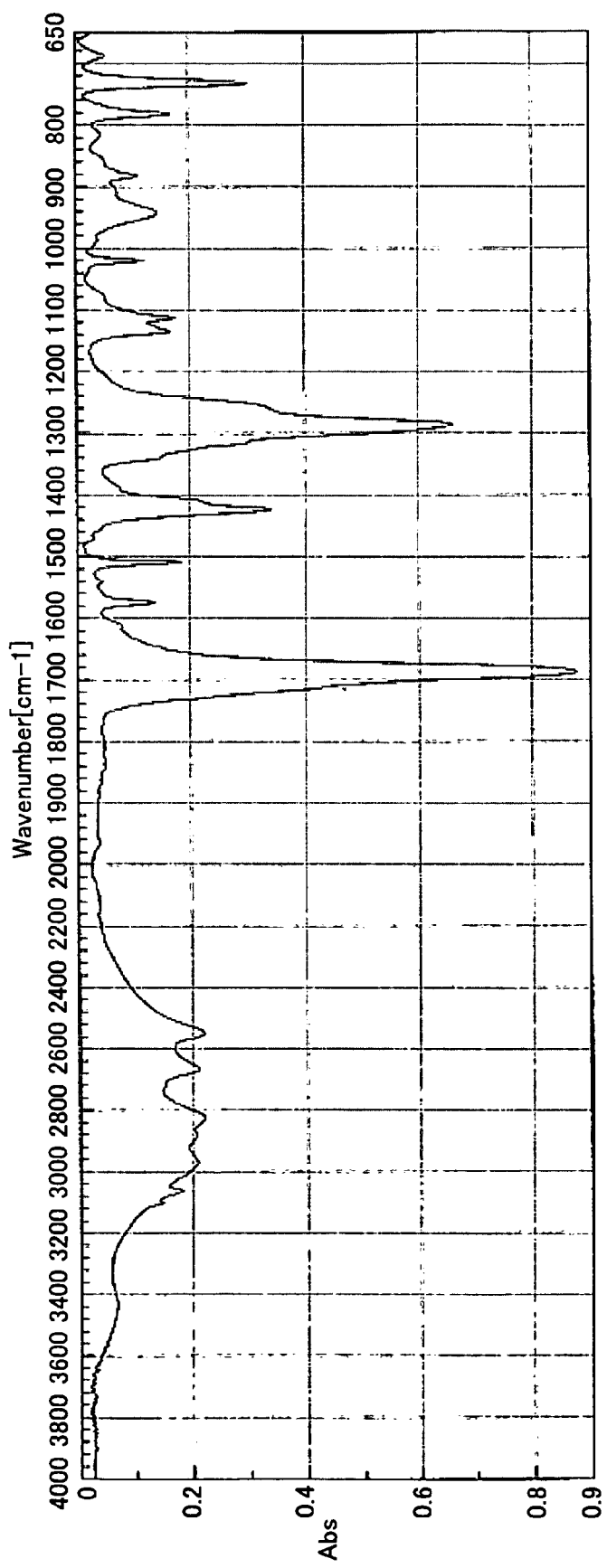
FIG. 18 is an IR graph of product.

As a result, the sample was whitened and became brittle. FIG. 18 is the IR graph of the product. As seen in FIG. 18, it was found that the PET sample to generate terephthalic acid was decomposed in the experiment. Since, however, also the PET peak was observed, the product is concluded as a mixture of terephthalic acid and PET.

Figure 19:
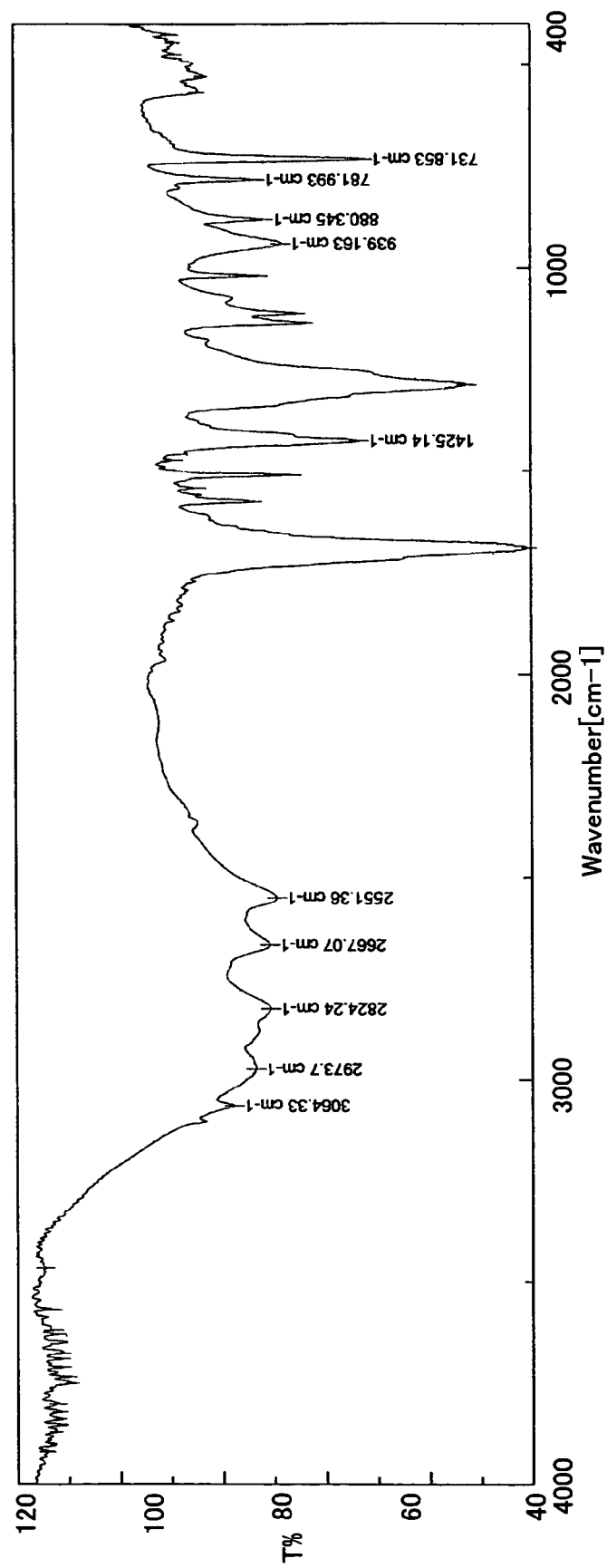
FIG. 19 is an IR graph of product.

Similarly, a sample of transparent flake of PET bottle was decomposed at 160° C. under 6.1 atm for 22 hours. The resulted product was collected to be conducted IR analysis. The sample became brown-whitening and brittle. FIG. 19 is the IR graph of the product. As seen in FIG. 18, it was found that the PET sample was decomposed to generate terephthalic acid in the experiment. That is, the terephthalic acid which is the raw material before polymerizing to PET was obtained under the condition of exposure to a saturation water vapor pressure at a temperature between 132.7° C. which is the crystallization point and 257.3° C. which is the melting point.

Consideration on the Result

From the above result, it was confirmed that, also for PET, the reaction products can be separated into gas or liquid component and solid component by hydrolysis treatment under similar condition to that for polylactic acid to be collected individually. In this manner, not limited to the polylactic acid resin products, the waste of synthetic resin product having ester bond in the composition structure thereof, such as PET, can be hydrolyzed by the above-described method, and the reaction products can be separated into gas or liquid component and solid component to be collected individually. As a result, the problem of waste treatment and the problem of effective utilization of resources are solved, and a favorable resource closed cycle system can be established.

The invention claimed is:
1. A method for decomposing and reclaiming synthetic resin having ester bond in the composition structure thereof, comprising the steps of hydrolysis treatment and separation collection treatment, wherein said hydrolysis treatment is a treatment in which an article to be treated containing a synthetic resin to be decomposed and reclaimed is exposed to a water vapor atmosphere under a saturated water vapor pressure at a treatment temperature under the condition of treatment temperature of at or below the melting point of the synthetic resin, and the synthetic resin in said article to be treated is hydrolyzed by the saturated water vapor generated at the treatment temperature, thus a decomposition product before polymerizing to the synthetic resin containing ester bond in the composition structure thereof is generated, and then after the reaction treatment, cooling the decomposition product while controlling the temperature and pressure of the water vapor to follow a saturated water vapor pressure curve, and wherein said separation collection treatment is a treatment in which the decomposition product generated by said hydrolysis treatment is separated into gas or liquid component and solid component to be collected individually.

2. The method for decomposing and reclaiming synthetic resin having ester bond in the composition structure thereof according to claim 1, wherein said hydrolysis treatment is a treatment in which heating and cooling are applied while controlling the temperature and pressure of the water vapor along a saturated water vapor pressure curve, and the synthetic resin in said article to be treated is hydrolyzed by the saturated water vapor generated at the treatment temperature, thus a decomposition product before polymerizing to the synthetic resin containing ester bond in the composition structure thereof is generated.

3. The method for decomposing and reclaiming synthetic resin having ester bond in the composition structure thereof according to claim 1, wherein said separation collection treatment contains a treatment of selectively collecting a specified liquid component by selecting the liquid component generated in said hydrolysis treatment with a filter.

4. The method for decomposing and reclaiming synthetic resin having ester bond in the composition structure thereof according to claim 1, wherein said hydrolysis treatment contains a treatment of extracting selectively a specified decomposition product utilizing the differences in physical properties selected from the group consisting of boiling point and melting point of said decomposition product, and solubility in water, water vapor, and high-boiling organic solvent thereof.

5. The method for decomposing and reclaiming synthetic resin having ester bond in the composition structure thereof according to claim 1, wherein said hydrolysis treatment contains a treatment in which water is added to said article to be treated containing the synthetic resin to be decomposed and reclaimed in a sufficient quantity to obtain the saturation water vapor pressure, thus hydrolysis of the synthetic resin existing in the article to be treated is conducted under the saturation water vapor pressure, and the decomposition product before polymerizing to the synthetic resin containing ester bond in the composition structure thereof is generated.

6. The method for decomposing and reclaiming synthetic resin having ester bond in the composition structure thereof according to claim 1, wherein said hydrolysis treatment is a treatment in which a polylactic acid resin product is adopted as the article to be treated, and said article to be treated is exposed to a water vapor atmosphere filled with a saturation water vapor pressure at a temperature specified by a temperature condition of at least about 120° C. to assure a practically short time reaction, with an upper limit of the temperature of about 170° C. which is the melting point of the polylactic acid resin product, the hydrolysis reaction to the polylactic acid resin existing in said article to be treated is generated, and then, after the reaction, generating a decomposition product such as lactic acid monomer, lactic acid oligomer, and low-molecular weight polylactic acid resin as the product before polymerizing to the polylactic acid resin, and wherein said separation collection treatment is a treatment of separation and collection of the liquid component such as lactic acid monomer, lactic acid oligomer, and low-molecular weight polylactic acid resin, generated by said hydrolysis treatment, and the solid component such as aggregate and filler existing in the polylactic acid resin product.

7. The method for decomposing and reclaiming synthetic resin having ester bond in the composition structure thereof according to claim 1, wherein said hydrolysis treatment is a treatment in which an article to be treated containing a target resin for treatment is exposed to a water vapor atmosphere filled with a saturation water vapor pressure at a temperature specified by a temperature condition of at least the crystallization temperature of said target resin for treatment, with an upper limit of the temperature of the melting point of the article to be treated, the hydrolysis reaction to said target resin for treatment is generated, and then, after the reaction, generating a decomposition product which is the component before polymerizing to said target resin for treatment as gas or liquid component and solid component, and wherein said separation collection treatment is a treatment of separation of the gas component or the solid component (filler, aggregate, or attached matter such as paint) existing in the liquid component, generated by said hydrolysis treatment, with a filter, and of collection of the liquid component as a solution, and further of temperature-reduction of the collected solution to crystallize a component, which crystallized component is then separated from other water-soluble component (such as pigment) by a filter, thus a solid of high purity component is obtained.

8. The method for decomposing and reclaiming synthetic resin having ester bond in the composition structure thereof according to claim 1, further comprising the step of applying pretreatment before said hydrolysis treatment, by heating said article to be treated to a temperature at least at a temperature at or above the crystallization temperature of said synthetic resin to be decomposed and reclaimed, with an upper limit of the melting point of said synthetic resin to be decomposed and reclaimed.

9. The method for decomposing and reclaiming synthetic resin according to claim 8, wherein said pretreatment is a treatment of heating said article to be treated to a temperature in a range from the crystallization point of polylactic acid resin, (about 100° C.), to the melting point of the polylactic acid resin, (about 170° C.).

10. The method for decomposing and reclaiming synthetic resin having ester bond in the composition structure thereof according to claim 8, wherein said pretreatment is a treatment of charging said article to be treated containing polylactic acid resin into a treatment chamber, and of heating thereof, and said hydrolysis treatment comprises a heating-mode treatment and a cooling-mode treatment, wherein said heating-mode treatment is a treatment in which water is added into said treatment chamber, after said pretreatment, in a sufficient quantity to fill the treatment chamber with the saturation water vapor pressure, thus reaction between polylactic acid resin existing in said article to be treated and water under the saturation water vapor pressure at a temperature in a range from about 100° C. to 150° C. is conducted, an aqueous solution of lactic acid is generated, and wherein said cooling-mode treatment is a treatment in which the pressure and temperature of the water vapor are lowered along a preliminarily determined saturation water vapor pressure curve, thus lactic acid generated is extracted during the progress of hydrolysis of said polylactic acid resin.

11. The method for decomposing and reclaiming synthetic resin having ester bond in the composition structure thereof according to claim 8, comprising the steps of:
charging said article to be treated containing polylactic acid resin as the article to be treated into a treatment chamber, and, as said pretreatment, heating said article to be treated to a temperature in a range from the crystallization point of polylactic acid resin existing in said article to be treated to the melting point thereof for at least 30 minutes;
adding water into said treatment chamber in a sufficient quantity to fill said treatment chamber with the saturation water vapor pressure, then closing said treatment chamber;
heating inside of said treatment chamber to a temperature in a range from 100° C. to 150° C.;
maintaining the internal pressure of said treatment chamber to the saturation water vapor pressure at the heating temperature for hydrolysis treatment in a range from 100° C. to 150° C., thus converting polylactic acid resin in said article to be treated into an aqueous solution of lactic acid by hydrolysis reaction to extract the lactic acid and the aqueous solution of lactic acid;
after completing the heating-mode treatment of said article to be treated, controlling the temperature and the pressure along a saturation water vapor pressure curve preliminarily determined by the cooling-mode treatment, and decreasing the vapor pressure inside of said treatment chamber to bring the vapor inside of said treatment chamber condensed into the aqueous solution of lactic acid;
collecting the extracted lactic acid and the aqueous solution of lactic acid; and
collecting the solid matter including the article to be treated containing polylactic acid resin, other than the polylactic acid remained in said treatment chamber.

12. The method for decomposing and reclaiming synthetic resin having ester bond in the composition structure thereof according to claim 8, wherein said hydrolysis treatment conducts crushing said article to be treated, separates the crushed article to be treated into resulting granular product and deformed product, and applies hydrolysis to said granular product.

13. The method for decomposing and reclaiming synthetic resin having ester bond in the composition structure thereof according to claim 10, wherein said pretreatment is a treatment of charging an article to be treated containing polylactic acid resin into a treatment chamber for said pretreatment, and then heating said article to be treated, and wherein said hydrolysis treatment is a treatment of charging crystallized polylactic acid resin taken out from said treatment chamber for the pretreatment into said chamber for the hydrolysis treatment, thus conducting said hydrolysis treatment.

* * * * *